(12) United States Patent
Suzuki et al.

(10) Patent No.: US 11,962,533 B2
(45) Date of Patent: Apr. 16, 2024

(54) USER EQUIPMENT AND BASE STATION PERFORMING TRANSMISSION AND RECEPTION OPERATIONS

(71) Applicant: PANASONIC INTELLECTUAL PROPERTY CORPORATION OF AMERICA, Torrance, CA (US)

(72) Inventors: Hidetoshi Suzuki, Kanagawa (JP); Hongchao Li, Langen (DE); Ankit Bhamri, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 363 days.

(21) Appl. No.: 17/506,461

(22) Filed: Oct. 20, 2021

(65) Prior Publication Data

US 2022/0045816 A1 Feb. 10, 2022

Related U.S. Application Data

(63) Continuation of application No. PCT/EP2020/054559, filed on Feb. 20, 2020.

(30) Foreign Application Priority Data

May 2, 2019 (EP) .................................... 19172400

(51) Int. Cl.
*H04L 5/00* (2006.01)
*H04L 27/26* (2006.01)
*H04W 72/23* (2023.01)

(52) U.S. Cl.
CPC .......... *H04L 5/0051* (2013.01); *H04L 5/0044* (2013.01); *H04L 5/0048* (2013.01); *H04L 27/2613* (2013.01); *H04W 72/23* (2023.01)

(58) Field of Classification Search
None
See application file for complete search history.

(56) References Cited

U.S. PATENT DOCUMENTS

2019/0296872 A1* 9/2019 Fehrenbach .......... H04L 5/0094
2022/0141857 A1* 5/2022 Lee ....................... H04W 72/23
370/329

(Continued)

OTHER PUBLICATIONS

Author Unknown, Enhanced UL transmission with configured grant for URLLC, Doc. No. R1-1902809, pp. 1-8, Mar. 1 (Year: 2019).*

(Continued)

*Primary Examiner* — Christopher M Crutchfield
(74) *Attorney, Agent, or Firm* — Seed IP Law Group LLP

(57) ABSTRACT

The present disclosure relates to a user equipment, a base station and respective methods. The user equipment (UE) receives a single uplink grant for a plurality of PUSCH transmissions. The single uplink grant comprises an antenna port field with an index value that is to be used for the plurality of PUSCH transmissions. The UE determines time-domain resources based on the received uplink grant. The determined time-domain resources prescribe a number of PUSCH transmissions and a length of each of the number of PUSCH transmissions. The UE transmits the number of PUSCH transmissions using the determined time-domain resources. Each of the number of PUSCH transmissions comprises at least one front-loaded demodulation reference signal, DMRS. In particular, the UE determines a number of symbols to be used for each of the at least one front-loaded DMRS of the number of PUSCH transmissions based on the received index value, and, in case at least two of the number of PUSCH transmissions have different lengths, and in case different numbers of symbols are permissible for each of the at least one front-loaded DMRS, the UE transmits the same or a smaller number of PUSCH transmissions such that, for (Continued)

none of the comprised at least one front-loaded DMRS, a different determined numbers of symbols is used.

12 Claims, 10 Drawing Sheets

(56) References Cited

U.S. PATENT DOCUMENTS

| | | | | |
|---|---|---|---|---|
| 2022/0166468 | A1* | 5/2022 | Go | H04B 7/0456 |
| 2022/0191892 | A1* | 6/2022 | Muruganathan | H04W 72/23 |
| 2022/0337456 | A1* | 10/2022 | Kwak | H04W 76/11 |

OTHER PUBLICATIONS

Author Unknown, Enhanced UL configured grant transmissions, Doc. No. R1-1901562, pp. 1-16, Mar. 1 (Year: 2019).*
Author Unknown, Considerations on DMRS for CP-OFDM, Doc. No. R1-1707784, pp. 1-6, May 19 (Year: 2017).*
Author Unknown, Consideration on enhanced UL grant-free transmissions, Doc. No. R1-1902181, pp. 1-3, Mar. 1 (Year: 2019).*
Author Unknown, Potential enhancement for UL grant-free transmission, Doc. No. R1-1902301, pp. 1-4, Mar. 1 (Year: 2019).*
Author Unknown, Summary of 7.2.6.3 Enhanced configured grant PUSCH transmissions, Doc. No. R1-1903341, pp. 1-73, Mar. 1 (Year: 2019).*
3GPP TR 38.801 V14.0.0, "3rd Generation Partnership Project; Technical Specification Group Radio Access Network; Study on new radio access technology: Radio access architecture and interfaces (Release 14)," Mar. 2017, 91 pages.
3GPP TR 38.804 V14.0.0, "3rd Generation Partnership Project; Technical Specification Group Radio Access Network; Study on New Radio Access Technology; Radio Interface Protocol Aspects (Release 14)," Mar. 2017, 56 pages.
3GPP TR 38.824 V2.0.1, "3rd Generation Partnership Project; Technical Specification Group Radio Access Network; Study on physical layer enhancements for NR ultra-reliable and low latency case (URLLC) (Release 16)," Mar. 2019, 78 pages.
3GPP TR 38.824 V16.0.0, "3rd Generation Partnership Project; Technical Specification Group Radio Access Network; Study on physical layer enhancements for NR ultra-reliable and low latency case (URLLC) (Release 16)," Mar. 2019, 78 pages.
3GPP TR 38.913 V15.0.0, "3rd Generation Partnership Project; Technical Specification Group Radio Access Network; Study on Scenarios and Requirements for Next Generation Access Technologies; (Release 15)," Jun. 2018, 39 pages.
3GPP TS 22.261 V16.4.0, "3rd Generation Partnership Project; Technical Specification Group Services and System Aspects; Service requirements for the 5G system; Stage 1 (Release 16)," Jun. 2018, 55 pages.
3GPP TS 38.211 V15.4.0, "3rd Generation Partnership Project; Technical Specification Group Radio Access Network; NR; Physical channels and modulation (Release 15)," Dec. 2018, 96 pages.
3GPP TS 38.211 V15.5.0, "3rd Generation Partnership Project; Technical Specification Group Radio Access Network; NR; Physical channels and modulation (Release 15)," Mar. 2019, 96 pages.
3GPP TS 38.212 V15.4.0, "3rd Generation Partnership Project; Technical Specification Group Radio Access Network; NR; Multiplexing and channel coding (Release 15)," Dec. 2018, 100 pages.
3GPP TS 38.212 V15.5.0, "3rd Generation Partnership Project; Technical Specification Group Radio Access Network; NR; Multiplexing and channel coding (Release 15)," Mar. 2019, 101 pages.
3GPP TS 38.213 V15.4.0, "3rd Generation Partnership Project; Technical Specification Group Radio Access Network; NR; Physical layer procedures for control (Release 15)," Dec. 2018, 104 pages.
3GPP TS 38.214 V15.4.0, "3rd Generation Partnership Project; Technical Specification Group Radio Access Network; NR; Physical layer procedures for data (Release 15)," Dec. 2018, 103 pages.
3GPP TS 38.300 V15.0.0, "3rd Generation Partnership Project; Technical Specification Group Radio Access Network; NR; NR and NG-RAN Overall Description; Stage 2 (Release 15)," Dec. 2017, 68 pages.
3GPP TS 38.331 V15.5.0, "3rd Generation Partnership Project; Technical Specification Group Radio Access Network; NR; Radio Resource Control (RRC) protocol specification (Release 15)," Mar. 2019, 491 pages.
Ericsson, "NR High-Reliability URLLC scope for RAN1/RAN2," RP-172817, Agenda Item: 9.2.1, 6 pages.
Extended European Search Report, dated Oct. 28, 2019, for corresponding European Application No. 19172400.4-1219, 11 pages.
Huawei, HiSilicon, Nokia, Nokia Shanghai Bell, "New SID on Physical Layer Enhancements for NR URLLC," RP-181477, Agenda Item: 9.1.9, 3GPP TSG-RAN#80, La Jolla, US, Jun. 11-14, 2018, 5 pages.
International Search Report, dated Apr. 29, 2020, for corresponding International Application No. PCT/EP2020/054559, 3 pages.
ITU-R, "IMT Vision—Framework and overall objectives of the future development of IMT for 2020 and beyond," Recommendation ITU-R M.2083-0, *M Series, Mobile, radiodetermination, amateur and related satellite services*, Sep. 2015, 21 pages.
NTT Docomo, Inc., "Revised WID on New Radio Access Technology," RP-172115 (revision of RP-172109), Agenda Item: 9.2.1, 3GPP TSG RAN Meeting #77, Sapporo, Japan, Sep. 11-14, 2017, 11 pages.
NTT Docomo, Inc., "Summary for Rel-15 UL transmission procedure," R1-1905608, Agenda Item: 7.1.3, 3GPP TSG RAN WG1 Meeting #96bis, Xi-an, China, Apr. 8-12, 2019, 10 pages.
Panasonic, "On PUSCH enhancement for Nr Urllc," R1-1904188, Agenda Item: 7.2.6.3, 3GPP TSG RAN WG1 #96bis, Xi-an, China, Apr. 8-12, 2019, 6 pages.
Sony, "L1 enhancement on PUSCH for URLLC," R1-1900372, Agenda Item: 7.2.6.1.3, 3GPP TSG RAN WG1 Ad-Hoc Meeting 1901, Taipei, Taiwan, Jan. 21-25, 2019, 5 pages.

* cited by examiner

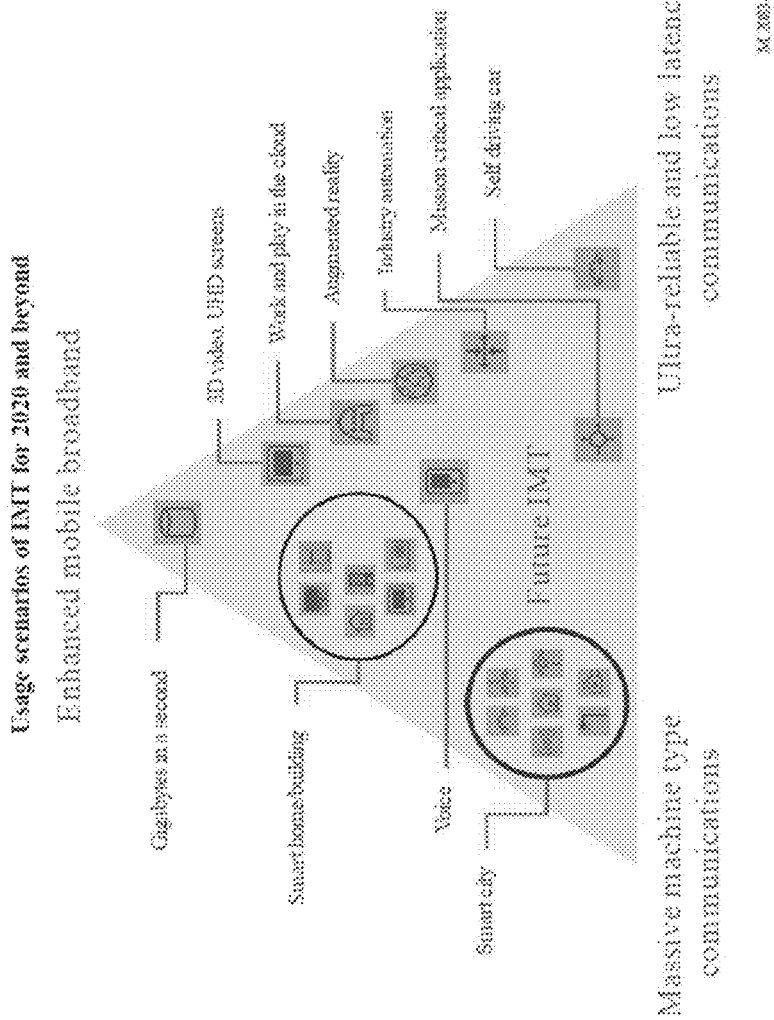

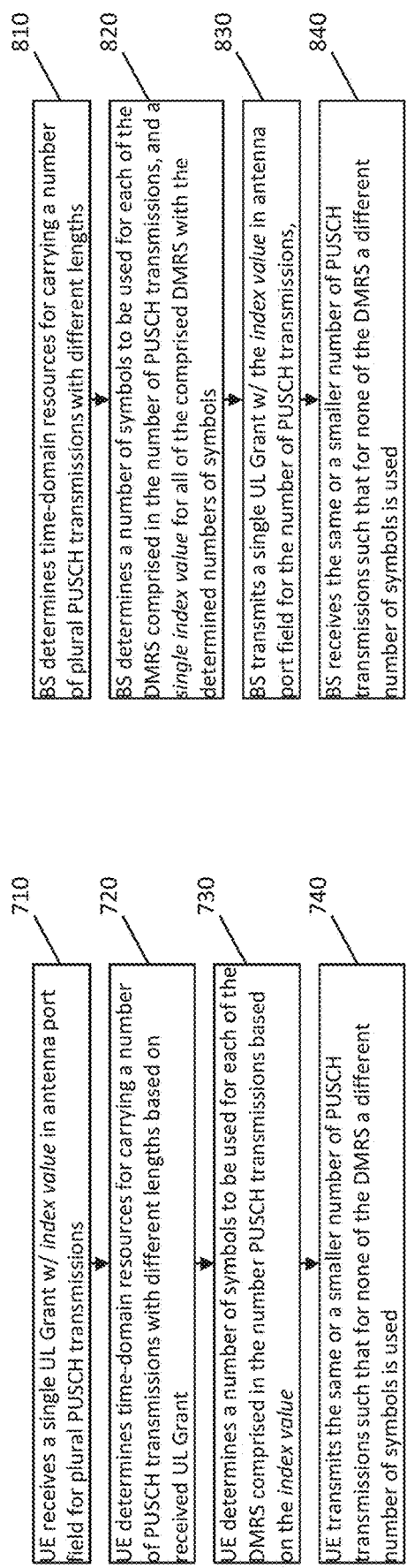

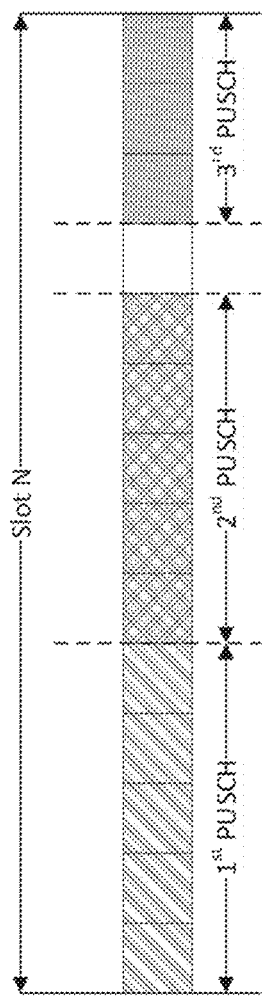
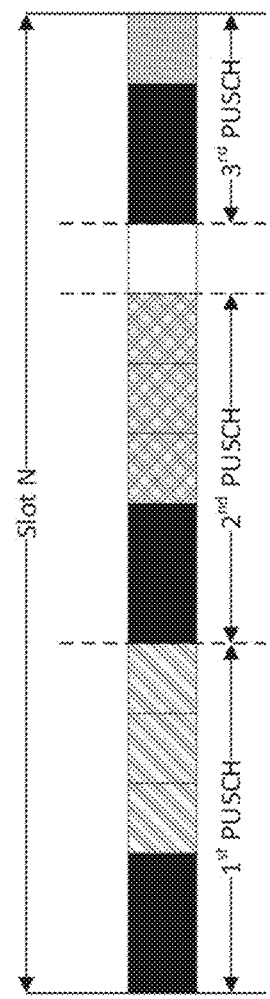
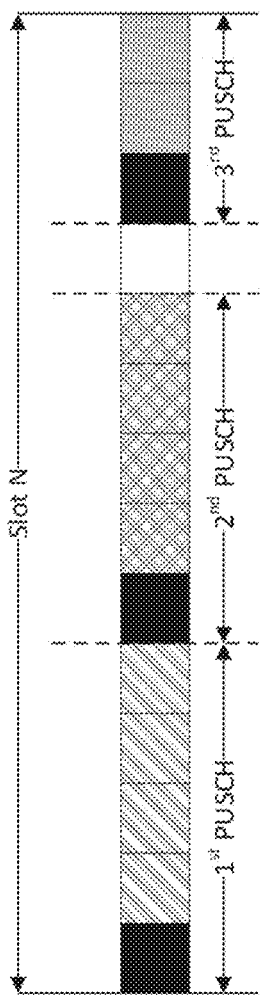

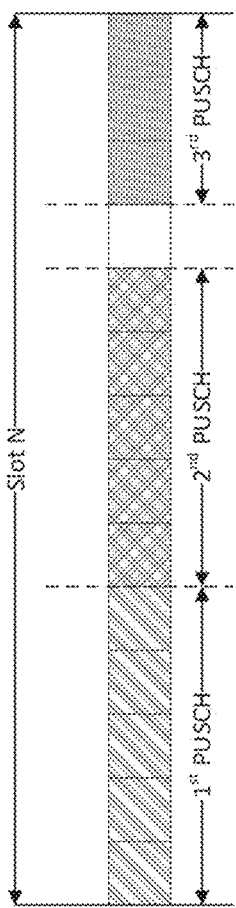
Fig. 18
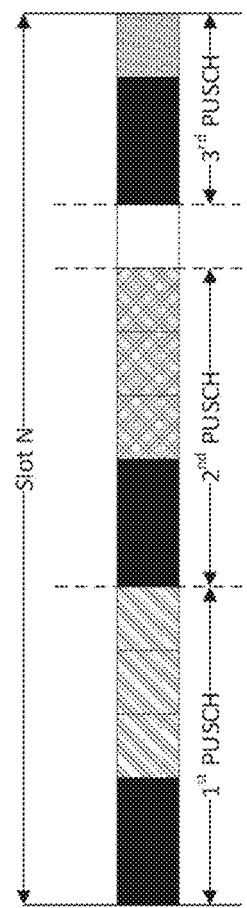
Fig. 19 Incorrect
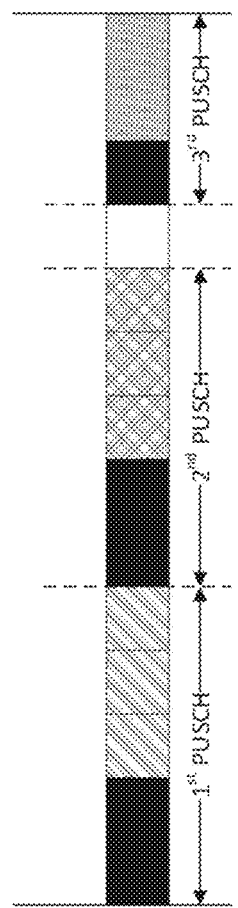
Fig. 20 Correct

USER EQUIPMENT AND BASE STATION PERFORMING TRANSMISSION AND RECEPTION OPERATIONS

BACKGROUND

Technical Field

The present disclosure relates to transmission and reception of signals in a communication system. In particular, the present disclosure relates to methods and apparatuses for such transmission and reception.

Description of the Related Art

The 3rd Generation Partnership Project (3GPP) works at technical specifications for the next generation cellular technology, which is also called fifth generation (5G) including "New Radio" (NR) radio access technology (RAT), which operates in frequency ranges up to 100 GHz.

The NR is a follower of the technology represented by Long Term Evolution (LTE) and LTE Advanced (LTE-A). The NR is planned to facilitate providing a single technical framework addressing several usage scenarios, requirements and deployment scenarios defined including, for instance, enhanced mobile broadband (eMBB), ultra-reliable low-latency communications (URLLC), massive machine type communication (mMTC), and the like.

For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include scenarios with large number of devices with non-time critical data transfers such as smart wearables and sensor networks.

The services eMBB and URLLC are similar in that they both demand a very broad bandwidth, however are different in that the URLLC service requires ultra-low latencies and very high reliability. In NR, the Physical layer is based on time-frequency resources (such as Orthogonal Frequency Division Multiplexing, OFDM in LTE) and supports multiple antenna operation.

For systems like LTE and NR, further improvements and options may facilitate efficient operation of the communication system as well as particular devices pertaining to the system.

BRIEF SUMMARY

One non-limiting and exemplary embodiment facilitates improving support for assignment of physical uplink shared channel (PUSCH) transmissions with flexible timings and permitting an accurate channel estimation using demodulation reference signals (DMRS) carried therein.

In an embodiment, the techniques disclosed herein feature a user equipment, UE, comprising a receiver, a processor and a transmitter. The receiver receives a single uplink grant for a plurality of PUSCH transmissions. The single uplink grant comprises an antenna port field with an index value that is to be used for the plurality of PUSCH transmissions. The processor determines time-domain resources based on the received uplink grant. The determined time-domain resources prescribe a number of PUSCH transmissions and a length of each of the number of PUSCH transmissions. The transmitter transmits the number of PUSCH transmissions using the determined time-domain resources. Each of the number of PUSCH transmissions comprises at least one front-loaded demodulation reference signal, DMRS.

In particular, the processor determines a number of symbols to be used for each of the at least one front-loaded DMRS of the number of PUSCH transmissions based on the received index value, and, in case at least two of the number of PUSCH transmissions have different lengths, and in case different numbers of symbols are permissible for each of the at least one front-loaded DMRS, the transmitter transmits the same or a smaller number of PUSCH transmissions such that, for none of the comprised at least one front-loaded DMRS, a different determined numbers of symbols is used.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following, exemplary embodiments are described in more detail with reference to the attached figures and drawings.

FIG. 3 is a schematic drawing showing usage scenarios of Massive Machine Type Communications (mMTC) and Ultra Reliable and Low Latency Communications (URLLC)

FIGS. 7-8 illustrates a sequence diagram of a user equipment (UE) and of a base station (BS) performing plural PUSCH transmissions according to a first generic mechanism;

FIGS. 11-13 depict schematic illustrations of resource allocations in time domain according to a usage of the first generic mechanism;

FIGS. 18-20 depict schematic illustrations of resource allocations in time domain according to a usage of the first generic mechanism.

DETAILED DESCRIPTION

As presented in the background section, 3GPP is working at the next releases for the 5th generation cellular technology, simply called 5G, including the development of a new radio (NR) access technology operating in frequencies ranging up to 100 GHz. 3GPP has to identify and develop the technology components needed for successfully standardizing the NR system timely satisfying both the urgent market needs and the more long-term requirements. In order to achieve this, evolutions of the radio interface as well as radio network architecture are considered in the study item "New Radio Access Technology." Results and agreements are collected in the Technical Report TR 38.804 v14.0.0, incorporated herein in its entirety by reference.

Figure 1:
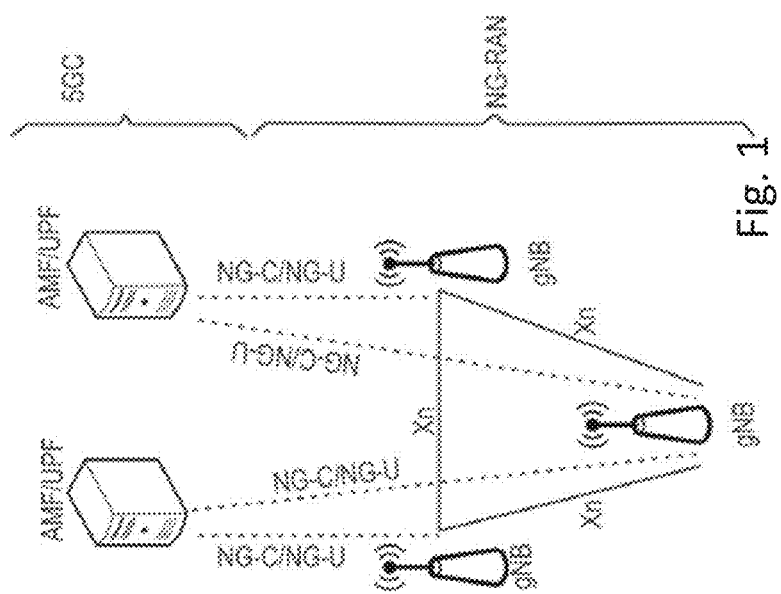
FIG. 1 illustrates a schematic drawing of an exemplary architecture for a 3GPP NR system.

Among other things, there has been an agreement on the overall system architecture. The NG-RAN (Next Generation—Radio Access Network) consists of gNBs, providing the NG-radio access user plane, SDAP/PDCP/RLC/MAC/PHY (Service Data Adaptation Protocol/Packet Data Convergence Protocol/Radio Link Control/Medium Access Control/Physical) and control plane, RRC (Radio Resource Control) protocol terminations towards the UE. The NG-RAN architecture is illustrated in FIG. 1, based on TS 38.300 v.15.0.0, section 4 incorporated herein by reference. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface.

Figure 2:
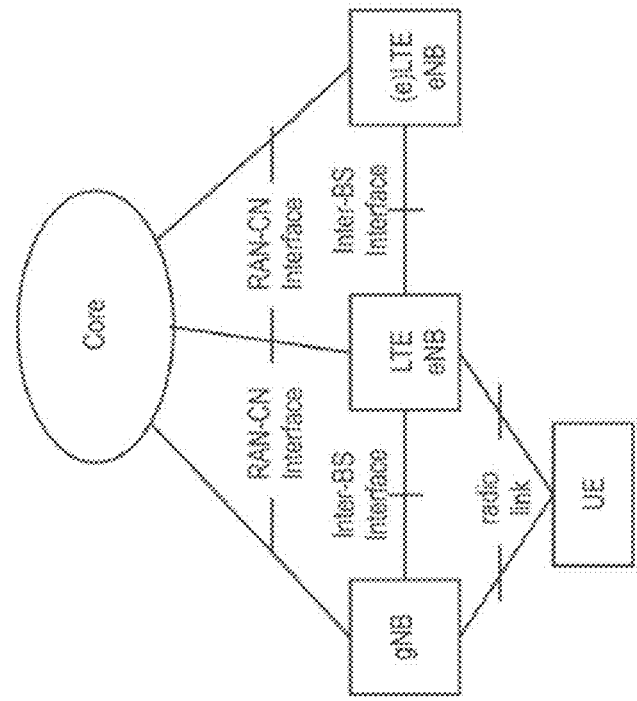
FIG. 2 shows a block diagram of an exemplary user and control plane architecture for the LTE eNB, NR gNB, and UE.

Various different deployment scenarios are have been discussed for being supported, as reflected, e.g., in 3GPP TR 38.801 v14.0.0, "Study on new radio access technology: Radio access architecture and interfaces." For instance, a non-centralized deployment scenario (section 5.2 of TR 38.801; a centralized deployment is illustrated in section 5.4 incorporated herein by reference) is presented therein, where base stations supporting the 5G NR can be deployed. FIG. 2 illustrates an exemplary non-centralized deployment scenario and is based on FIG. 5.2.-1 of said TR 38.801, while additionally illustrating an LTE eNB as well as a user equipment (UE) that is connected to both a gNB and an LTE eNB. As mentioned before, the new eNB for NR 5G may be exemplarily called gNB.

As also mentioned above, in 3rd generation partnership project new radio (3GPP NR), three use cases are being considered that have been envisaged to support wide variety of services and applications by IMT-2020 (see Recommendation ITU-R M.2083: IMT Vision—"Framework and overall objectives of the future development of IMT for 2020 and beyond," September 2015). The specification for the phase 1 of enhanced mobile-broadband (eMBB) has been concluded by 3GPP in December 2017. In addition to further extending the eMBB support, the current and future work would involve the standardization for ultra-reliable and low-latency communications (URLLC) and massive machine-type communications. FIG. 3 (from the Recommendation ITU-R M.2083) illustrates some examples of envisioned usage scenarios for IMT for 2020 and beyond.

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. In the current WID (work item description) RP-172115, it is agreed to support the ultra-reliability for URLLC by identifying the techniques to meet the requirements set by TR 38.913. For NR URLCC in Release 15, key requirements include a target user plane latency of 0.5 ms for UL (uplink) and 0.5 ms for DL (downlink). The general URLLC requirement for one transmission of a packet is a BLER (block error rate) 1E-5 for a packet size of 32 bytes with a user plane of 1 ms.

From RAN1 perspective, reliability can be improved in a number of possible ways. The scope for improving the reliability in Rel. 15 is captured in RP-172817 that includes defining of separate CQI tables for URLLC, more compact DCI formats, repetition of PDCCH, etc. However, the scope may widen for achieving ultra-reliability as the NR becomes more stable and developed (for NR URLCC key requirements, see also 3GPP TR 38.913 V15.0.0, "Study on Scenarios and Requirements for Next Generation Access Technologies" incorporated herein by reference). Accordingly, NR URLLC in Rel. 15 should be capable of transmitting 32 bytes of data packet within a user-plane latency of 1 ms at the success probability corresponding to a BLER of 1E-5. Particular use cases of NR URLCC in Rel. 15 include Augmented Reality/Virtual Reality (AR/VR), e-health, e-safety, and mission-critical applications (see also ITU-R M.2083-0).

Moreover, technology enhancements targeted by NR URLCC in Release 15 aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLCC) may be pre-empted by a transmission for a service type B (such as eMBB). Technology enhancements with respect to reliability improvement include dedicated CQI/MCS tables for the target BLER of 1E-5 (for the technology enhancements, see also 3GPP TS 38.211 "NR; Physical channels and modulation," TS 38.212 "NR; Multiplexing and channel coding," TS 38.213 "NR; Physical layer procedures for control," and TS 38.214 "NR; Physical layer procedures for data," respective versions V15.4.0, all incorporated herein by reference).

The use case of mMTC is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases and especially necessary for URLLC and mMTC is high reliability or ultra-reliability. Several mechanisms can be considered to improve the reliability from radio perspective and network perspective. In general, there are few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC Rel. 16, further use cases with tighter requirements have been identified such as factory automation, transport industry and electrical power distribution, including factory automation, transport industry, and electrical power distribution (see RP-181477, "New SID on Physical Layer Enhancements for NR URLLC," Huawei, HiSilicon, Nokia, Nokia Shanghai Bell, incorporated herein by reference). The tighter requirements are higher reliability (up to 10-6 level), higher availability, packet sizes of up to 256 bytes, time synchronization down to the order of a few μs where the value can be one or a few μs depending on frequency range and short latency in the order of 0.5 to 1 ms in particular a target user plane latency of 0.5 ms, depending on the use cases (see also 3GPP TS 22.261 "Service requirements for next generation new services and markets" V16.4.0, incorporated herein by reference and RP-181477).

Moreover, for NR URLCC in Rel. 16, several technology enhancements from RAN1 perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

In general, TTI determines the timing granularity for scheduling assignment. One TTI is the time interval in which given signals is mapped to the physical layer. Conventionally, the TTI length can vary from 14-symbols (slot-based scheduling) to 2-symbols (non-slot based scheduling). Downlink and uplink transmissions are specified to be organized into frames (10 ms duration) that are further divided into slots, the number of slots being defined by the numerology/subcarrier spacing and the specified values range between 10 slots for a subcarrier spacing of 15 kHz to 320 slots for a subcarrier spacing of 240 kHz. The number of OFDM symbols per slot is 14 for normal cyclic prefix and 12 for extended cyclic prefix (see section 4.1 (general frame structure), 4.2 (Numerologies), 4.3.1 (frames and subframes) and 4.3.2 (slots) of the 3GPP TS 38.211 V15.4.0, incorporated herein by reference).

However, assignment of time resources for transmission may also be non-slot based. In particular, the TTIs in non slot-based assignment may correspond to mini-slots rather than slots, e.g., one or more mini-slots may be assign to a requested transmission of data/control signaling. In non slot-based assignment, the minimum length of a TTI may conventionally range from 2 to 14 OFDM symbols.

PUSCH Repetitions

One of the scopes for potential enhancements is related to mini-slot repetition of PUSCH within a slot. In the following, a motivation for supporting repetition of PUSCH within a slot is provided which may allow for potential enhancements to the repetition mechanism for further improving the reliability and/or latency to satisfy the new requirements of NR URLLC. This motivation shall, however, not be understood as imposing any restrictions upon the present disclosure.

To achieve the latency requirement for URLLC PUSCH transmission, one-shot transmission (i.e., single (TTI) assignment) is ideal, provided the reliability requirement is satisfied. However, it is not always the case that the target BLER of 1E-6 is achieved with one-shot transmission. Therefore, retransmission or repetition mechanisms are required.

In NR Rel.15, both retransmissions and repetitions are supported to achieve the target BLER, when one-shot transmission is not enough. HARQ-based retransmission is well known to improve the overall reliability, by using the feedback information and improving the subsequent retransmissions according to the channel conditions. However, they suffer from additional delay due to feedback processing timeline. Therefore, repetitions are useful for highly delay-tolerant services, as they do subsequent transmission of the same transport blocks without waiting for any feedback.

A PUSCH repetition can be defined as "transmitting a same transport block more than once, without waiting for any feedback of previous transmission(s) of the same transport block." Advantages of PUSCH retransmissions are an improvement in the overall reliability and a reduction in latency in comparison with HARQ, as no feedback is required. However, in general, no link adaptation is possible, and resource usage may be inefficient.

In NR Rel. 15, limited support for repetitions is introduced. Only semi-static configurations of repetitions are allowed. Moreover, repetitions are allowed only between slots (slot level PUSCH repetition). A repetition is only possible in the slot following the slot of the previous transmission. Depending up on the numerology and service type (e.g., URLCC, eMBB), latency between the repetitions can be too long for inter-slot repetition.

Such limited support of repetition is mainly useful for PUSCH mapping type A. This PUSCH mapping type A only allow PUSCH transmissions starting from the beginning of the slot. With repetitions, this would result in an initial PUSCH transmission and each repetition stating at the beginning of plural consecutive slots.

Less useful is the limited support of repetition for a PUSCH mapping type B. PUSCH mapping type B allows PUSCH transmissions to start at any symbol within a slot. With repetitions, this would result in an initial PUSCH transmission and each repetition starting within a slot, at a same symbol of plural consecutive slots.

In any case, such limited support may not be able to achieve stricter latency requirements in NR Rel. 15, i.e., up to 0.5 ms latency. This would require mini-slot repetitions. Additionally, the limited support of repetitions does also not exploit the benefits resulting from mini-slots, namely, transmission time intervals (TTIs) including a smaller number of symbols than a slot (a slot comprising fourteen symbols).

PUSCH Assignments

Another of the scopes for potential enhancements is—more generally—related to assignments of PUSCH within one or across multiple slots. In the following, a motivation for supporting assignments of different PUSCH transmissions is provided which may allow for potential enhancements to the uplink usage for further improving the latency while meeting the reliability requirements to further satisfy new requirements of NR URLLC.

To achieve the latency requirement for URLLC PUSCH transmission, again a one-shot transmission (i.e., single (TTI) assignment) is ideal, provided the reliability is satisfied. However, it is not always the case that the target user plane latency of 0.5 ms is achieved for concurrent PUSCH transmissions. Therefore, enhancements to the uplink assignments are required.

In NR Rel. 15, uplink scheduling is constrained to a single uplink grant per TTI. In case of a single PUSCH transmission, this scheduling constraint is not a restriction and the target user plane latency may be achieved through a one-shot transmission. However, for concurrent PUSCH transmissions, the scheduling constraint results in that one-shot transmissions may not be enough to meet the target user plane latency.

In particular, concurrent PUSCH transmissions demand for separate uplink grants which, however, due to the scheduling constraints must be signaled in consecutive TTIs and also large scheduling overhead. Thus, this scheduling constraint introduces unnecessary delay in case of concurrent PUSCH transmissions. Also, plural mini-slot assignments of PUSCH within a slot are also not possible.

In any case, due to such scheduling constraints, it may not be able to achieve stricter latency requirements in NR Rel. 15, i.e., up to 0.5 ms latency. This would require mini-slot assignments of PUSCH. Additionally, the limited support of PUSCH assignments does also not exploit the benefits resulting from mini-slots, namely, transmission time intervals (TTIs) including a smaller number of symbols than a slot (a slot comprising fourteen symbols).

First Generic Scenario

Considering the above, the authors of the present disclosure have recognized that there is a need for more flexible support of PUSCH transmissions, namely for a mechanism which is not restricted to PUSCH transmissions which require separate uplink grants.

At a same time, the more in flexibility shall not come at the expense of additional signaling overhead. In other words, the authors of the present disclosure have recognized that the flexible support of PUSCH transmissions shall not require modifications to the present uplink scheduling mechanism, namely the present format of the uplink grant. In other words, the signaling mechanism, e.g., in form of downlink control information (DCI) format 0-0 or 0-1 for conveying an uplink grant, shall stay the same, thereby avoiding any additional signaling overhead when scheduling the PUSCH transmissions.

It is therefore a baseline understanding of the present disclosure that PUSCH transmissions shall be supported with flexible timings which do not create additional signaling overhead.

In this context, the support of flexible timings for such PUSCH transmissions is not only recognized as a possibility for enhancing the versatility of the mechanism, but also can be seen as a necessity for avoiding conflicts, for example, with dynamic changes to the slot format (UL/DL). This becomes apparent from an implementation which is discussed under section 6.3.3 as "Option 4" in 3GPP TR 38.824 v2.0.1, "Study on physical layer enhancements for NR ultra-reliable and low latency case (URLLC)" which is incorporated herein by reference.

Assuming for the sake of example that the proposed mechanism is utilized with a semi-static grant free (configured grant) uplink. At the time of configuration, the configured grant designates contiguous symbols of a slot for the plural PUSCH transmissions. This designation, however, can result in conflicts with dynamic changes to the slot format. For example, in case the slot format prescribes a change to one of the designated contiguous symbols from UL to DL, then this will trigger a conflict with the configured plural PUSCH transmissions.

Recognizing the demand for the support of flexible timings, the authors have, however, identified substantial technical constraints which result from the present uplink scheduling mechanism, namely to the downlink control information (DCI) format 0-1 of NR Rel.15.

One possibility of conveying an uplink grant is the downlink control information (DCI) format 0-1. This format (e.g., DCI format 0-1) is generally understood as the non-fallback format for supporting Single-User Multiple Input Multiple Output (SU-MIMO) or Multi-User Multiple Input Multiple Output (MU-MIMO) in the uplink. For this, the DCI format 0-1 comprises an antenna port field which permits a consistent of the antenna port(s) for the PUSCH transmissions.

An antenna port can be defined such that "the channel over which a symbol on the antenna port is conveyed can be inferred from the channel over which another symbol on the same antenna port is conveyed" (see, e.g., section 4.4 of 3GPP technical specification TS 38.211 v.15.5.0, titled "Physical channels and modulation (Release 15)"). The concept of antenna ports is also deployed to front-loaded demodulation reference signals (DMRS) comprised in the PUSCH transmissions.

For example, a first front-loaded DMRS configuration, corresponding to configuration type 1, supports up to four orthogonal DMRS ports if single-symbol DMRS is used, and up to eight orthogonal DMRS ports if double-symbol DMRS are used. A second front-loaded DMRS configuration, corresponding to configuration type 2, provides support for up to six orthogonal DMRS ports if singe-symbol DMRS are used, and up to twelve orthogonal ports if double-symbol DMRS are used. From a receiver's perspective, DMRS ports are quasi co-located.

Advantageously, the front-loaded DMRS configurations have been designed to permit a flexibility between using single-symbol DMRS and double-symbol DMRS. In particular, the configuration type 1 and configuration type 2 are devised to not only support the respective maximum length of symbols (e.g., maxLength=2) for DMRS but also lower number of symbols.

This can be seen, for example, for the configuration type 1 (e.g., dmrs-Type=1), which is reproduced in the following from section 7.3.1.1.2 of 3GPP technical specification TS 38.212 v.15.5.0, titled "Multiplexing and channel coding (Release 15)," incorporated herein by reference. For this configuration type 1, in case of a maximum of two-symbol DMRS, it is not only possible to schedule 8 DMRS ports but it is also possible to schedule up to 4 DMRS ports.

TABLE 7.3.1.1.2-7

Antenna Port(s), Transform Precoder is Enabled, dmrs-Type = 1, maxLength = 2

| Value | Number of DMRS CDM group(s) without data | DMRS port(s) | Number of front-load symbols |
|---|---|---|---|
| 0 | 2 | 0 | 1 |
| 1 | 2 | 1 | 1 |
| 2 | 2 | 2 | 1 |
| 3 | 2 | 3 | 1 |
| 4 | 2 | 0 | 2 |
| 5 | 2 | 1 | 2 |
| 6 | 2 | 2 | 2 |
| 7 | 2 | 3 | 2 |

TABLE 7.3.1.1.2-7-continued

Antenna Port(s), Transform Precoder is Enabled,
dmrs-Type = 1, maxLength = 2

| Value | Number of DMRS CDM group(s) without data | DMRS port(s) | Number of front-load symbols |
|---|---|---|---|
| 8 | 2 | 4 | 2 |
| 9 | 2 | 5 | 2 |
| 10 | 2 | 6 | 2 |
| 11 | 2 | 7 | 2 |
| 12-15 | Reserved | Reserved | Reserved |

With such front-loaded DMRS configurations, the antenna port field comprised in downlink control information (DCI) format 0-1 conveys an index value (see, e.g., column 1 in Table 7.3.1.1.2-7 of TS 38.212) which not only prescribes the DMRS port (see, e.g., column 3 in same Table) to be used for the front-loaded DMRS, but also prescribes the number of symbols (e.g., single-symbol or double symbol) to be used as the front-loaded DMRS (see, e.g., column 4 in same Table).

The authors of the present disclosure have recognized that such front-loaded DMRS configurations may result in substantial technical constraints when utilizing a single uplink grant of this DCI format 0-1 for scheduling the plural PUSCH transmissions with flexible timing.

Assuming for the sake of example that a single uplink grant is scheduling two PUSCH transmissions with flexible timings. Then, it is generally understood that such two PUSCH transmission require an individual indication of the DMRS port to be used. Due to the single uplink grant only comprising a single antenna port field, it is not possible to indicate individual DMRS ports to be used. Rather, it is only possible to convey one index value prescribing a one DMRS port for the respective front-loaded DMRS configuration. Thus, there exist an ambiguity whether this indicated DMRS port is to be used for the first or the second of the two PUSCH transmissions with flexible timings.

In other words, the authors of the present disclosure have recognized that there exists an ambiguity to which one of plural PUSCH transmissions the one index value carried in the antenna port field of the single uplink grant pertains.

Also, the authors have recognized that situations may occur where the scheduling of two PUSCH transmissions with flexible timings may introduce conflicts as to the mappings of the front-loaded DMRS in the PUSCH transmissions.

Assuming for the sake of example that a single uplink grant is scheduling two PUSCH transmissions with flexible timings, namely with different lengths. Then, it is generally understood that such two PUSCH transmissions are not necessarily permitted to comprise both, single-symbol and double-symbol DMRS. Rather, the length of a PUSCH transmissions imposes constraints upon number of symbols for DMRS which can be carried therein. This introduces an ambiguity whether the number of front-loaded symbols for DMRS indicated by the single uplink grant is to be used for the first or second of the two PUSCH transmissions with flexible timings.

In NR Rel. 15, demodulation reference signals for PUSCH are described in section 6.4.1.1 of 3GPP technical specification TS 38.211 in v.15.5.0, titled "Physical channels and modulation (Release 15)" incorporated herein by reference.

For the mapping to physical resources, the position(s) of the DMRS symbols is given by $\bar{l}$ and duration $l_d$ where, for example, $l_d$ is the duration between the first OFDM symbol of the slot and the last OFDM symbol of the scheduled PUSCH resources of the slot for PUSCH mapping type A according to Tables 6.4.1.1.3-3 and 6.4.1.1.3-4, or $l_d$ is the duration of scheduled PUSCH resources for PUSCH mapping type B according to Tables 6.4.1.1.3-3 and 6.4.1.1.3-4. The referenced Tables are reproduced herein-below.

TABLE 6.4.1.1.3-3

PUSCH DM-RS Positions $\bar{l}$ Within a Slot for Single-Symbol DM-RS and Intra-Slot Frequency Hopping Disabled

| | DM-RS positions $\bar{l}$ | | | | | | | |
|---|---|---|---|---|---|---|---|---|
| | PUSCH mapping type A dmrs-AdditionalPosition | | | | PUSCH mapping type B dmrs-AdditionalPosition | | | |
| $l_d$ in symbols | 0 | 1 | 2 | 3 | 0 | 1 | 2 | 3 |
| <4 | — | — | — | — | $l_0$ | $l_0$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0$ | $l_0, 4$ | $l_0, 4$ | $l_0, 4$ |
| 6 | $l_0$ | $l_0$ | $l_0$ | $l_0$ | $l_0$ | $l_0, 4$ | $l_0, 4$ | $l_0, 4$ |
| 7 | $l_0$ | $l_0$ | $l_0$ | $l_0$ | $l_0$ | $l_0, 4$ | $l_0, 4$ | $l_0, 4$ |
| 8 | $l_0$ | $l_0, 7$ | $l_0, 7$ | $l_0, 7$ | $l_0$ | $l_0, 6$ | $l_0, 3, 6$ | $l_0, 3, 6$ |
| 9 | $l_0$ | $l_0, 7$ | $l_0, 7$ | $l_0, 7$ | $l_0$ | $l_0, 6$ | $l_0, 3, 6$ | $l_0, 3, 6$ |
| 10 | $l_0$ | $l_0$ | $l_0, 6, 9$ | $l_0, 6, 9$ | $l_0$ | $l_0, 8$ | $l_0, 4, 8$ | $l_0, 3, 6, 9$ |
| 11 | $l_0$ | $l_0, 9$ | $l_0, 6, 9$ | $l_0, 6, 9$ | $l_0$ | $l_0, 8$ | $l_0, 4, 8$ | $l_0, 3, 6, 9$ |
| 12 | $l_0$ | $l_0, 9$ | $l_0, 6, 9$ | $l_0, 5, 8, 11$ | $l_0$ | $l_0, 10$ | $l_0, 5, 10$ | $l_0, 3, 6, 9$ |
| 13 | $l_0$ | $l_0, 11$ | $l_0, 7, 11$ | $l_0, 5, 8, 11$ | $l_0$ | $l_0, 10$ | $l_0, 5, 10$ | $l_0, 3, 6, 9$ |
| 14 | $l_0$ | $l_0, 11$ | $l_0, 7, 11$ | $l_0, 5, 8, 11$ | $l_0$ | $l_0, 10$ | $l_0, 5, 10$ | $l_0, 3, 6, 9$ |

TABLE 6.4.1.1.3-4

PUSCH DM-RS Positions $\bar{l}$ Within a Slot for Double-Symbol DM-RS and Intra-Slot Frequency Hopping Disabled

| | DM-RS positions $\bar{l}$ | | | | | | | |
|---|---|---|---|---|---|---|---|---|
| | PUSCH mapping type A dmrs-AdditionalPosition | | | | PUSCH mapping type B dmrs-AdditionalPosition | | | |
| $l_d$ in symbols | 0 | 1 | 2 | 3 | 0 | 1 | 2 | 3 |
| <4 | — | — | | | — | — | | |
| 4 | $l_0$ | $l_0$ | | | — | — | | |
| 5 | $l_0$ | $l_0$ | | | $l_0$ | $l_0$ | | |
| 6 | $l_0$ | $l_0$ | | | $l_0$ | $l_{0_q}$ | | |
| 7 | $l_0$ | $l_0$ | | | $l_0$ | $l_0$ | | |
| 8 | $l_0$ | $l_0$ | | | $l_0$ | $l_0, 5$ | | |
| 9 | $l_0$ | $l_0$ | | | $l_0$ | $l_0, 5$ | | |
| 10 | $l_0$ | $l_0, 8$ | | | $l_0$ | $l_0, 7$ | | |
| 11 | $l_0$ | $l_0, 8$ | | | $l_0$ | $l_0, 7$ | | |
| 12 | $l_0$ | $l_0, 8$ | | | $l_0$ | $l_0, 9$ | | |
| 13 | $l_0$ | $l_0, 10$ | | | $l_0$ | $l_0, 9$ | | |
| 14 | $l_0$ | $l_0, 10$ | | | $l_0$ | $l_0, 9$ | | |

With such a mapping of DMRS symbols to PUSCH, it directly follows that single-symbol DMRS are permitted for any duration of scheduled PUSCH resources, whereas double-symbol DMRS are only permitted, in case of mapping type A, when the duration of scheduled PUSCH resources is 4 symbols and higher (see $l_d<4$ resulting in an undefined DRMS position for mapping type A of Table 6.4.1.1.3-4), and in case of mapping type B, when the duration of scheduled PUSCH resources is 5 symbols and higher (see $l_d<4$ and $l_d=4$ resulting in an undefined DMRS position for mapping type A of Table 6.4.1.1.3-4).

In other words, the authors of the present disclosure have recognized that again there exists an ambiguity to which one of plural PUSCH transmissions the one index value carried in the antenna port field of the single uplink grant pertains.

In summary, the present disclosure of an exemplary embodiment facilitates improving support for assignment of physical uplink shared channel (PUSCH) transmissions with flexible timings and permitting an accurate channel estimation using demodulation reference signals (DMRS) carried therein.

Figure 4:
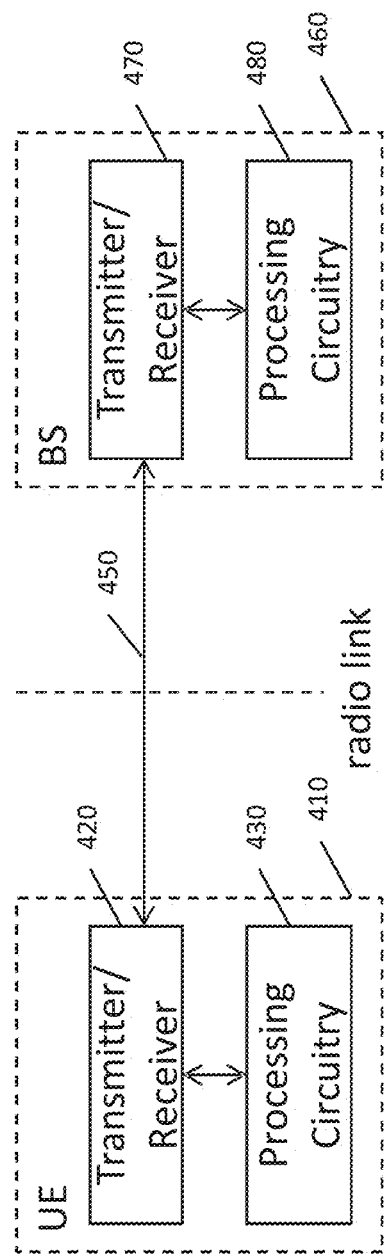
FIG. 4 shows a communication system in NR including a user equipment (UE) and a base station (BS) according to an exemplary scenario.

FIG. 4 shows an exemplary communication system including a user equipment (UE) 410 and a base station (BS) 460 in a wireless communication network. Such communication system may be a 3GPP system such as NR and/or LTE and/or UMTS. For example, as illustrated in the figure, the base station (BS) may be a gNB (gNodeB, e.g., an NR gNB) or an eNB (eNodeB, e.g., an LTE gNB). However, the present disclosure is not limited to these 3GPP systems or to any other systems.

Even though the embodiments and exemplary implementations are described using some terminology of 3GPP systems, the present disclosure is also applicable to any other communication systems, and in particular in any cellular, wireless and/or mobile systems.

Rather, it should be noted that many assumptions have been made herein so as to be able to explain the principles underlying the present disclosure in a clear and understandable manner. These assumptions are however to be understood as merely examples for illustration purposes and should not limit the scope of the disclosure. A skilled reader will be aware that the principles of the following disclosure and as laid out in the claims can be applied to different scenarios and in ways that are not explicitly described herein.

A mobile terminal is referred to in the LTE and NR as a user equipment (UE). This may be a mobile device such as a wireless phone, smartphone, tablet computer, or an USB (universal serial bus) stick with the functionality of a user equipment. However, the term mobile device is not limited thereto, in general, a relay may also have functionality of such mobile device, and a mobile device may also work as a relay.

A base station (BS) forms at least part of a system of interconnected units, for instance a (central) baseband unit and different radio frequency units, interfacing different antenna panels or radio heads in the network for providing services to terminals. In other words, a base station provides wireless access to terminals.

Referring back to the figure, the user equipment 410 comprises processing circuitry (or processor) 430 and a transmitter/receiver (or transceiver) 420 which are indicated as separate building blocks in the diagram. Similarly, base station 460, comprises processing circuitry (or processor) 480 and a transmitter/receiver (or transceiver) 470, which are indicated as separate building blocks in the diagram. The transmitter/receiver 420 of the user equipment 410 is communicatively coupled via a radio link 450 with the transmitter/receiver 470 of the base station 460.

Figure 6:
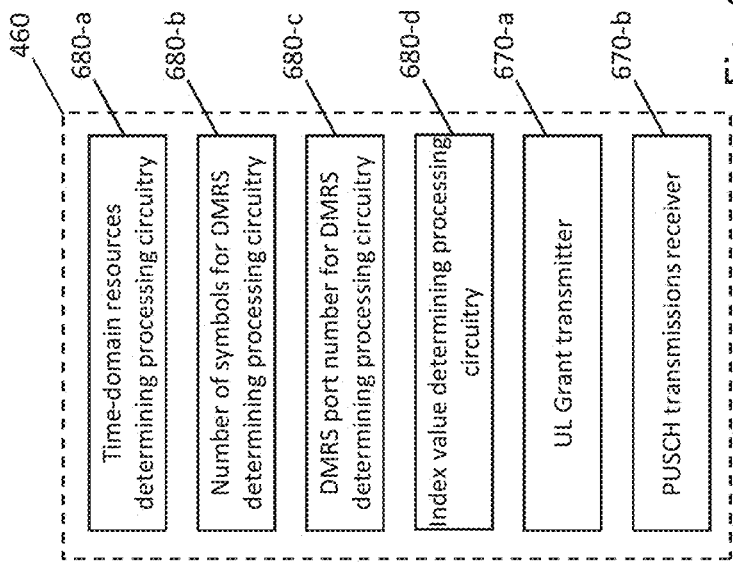
FIGS. 5-6 depict block diagrams of an exemplary implementation of the user equipment (UE) and of the base station (BS)
Figure 5:
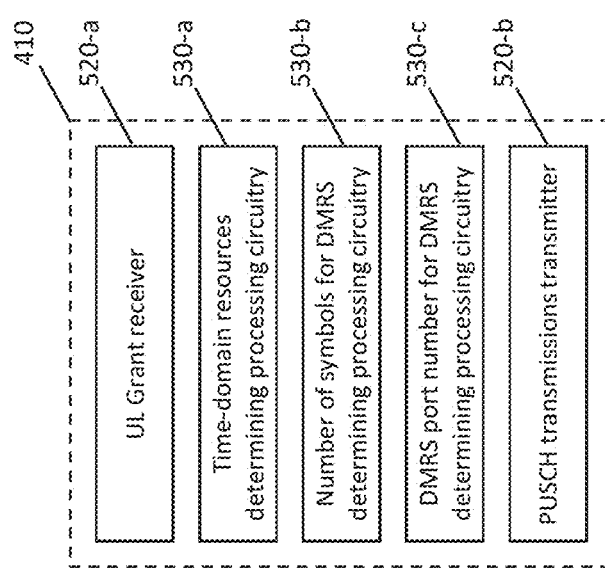

FIGS. 5 and 6 depict exemplary implementations according to a first generic scenario of the building blocks of the user equipment 410 and of the base station 460, respectively. The user equipment 410 of the exemplary implementation comprises an uplink grant receiver 520-*a*, a time-domain resource determining processing circuitry 530-*a*, a number of symbols for DMRS determining processing circuitry 530-*b*, a DMRS port number processing circuitry 530-*c*, and a PUSCH transmissions transmitter 520-*b*.

Similarly, the base station 460 of the exemplary implementation comprises a time-domain resource determining processing circuitry 680-*a*, a number of symbols for DMRS determining processing circuitry 680-*b*, a DMRS port number for DMRS determining processing circuitry 680-*c*, an index value determining processing circuitry 680-*d*, an uplink grant transmitter 670-*a*, and a PUSCH transmissions receiver 670-*b*.

The present disclosure is given with the assumption that user equipment 410 is to perform plural physical uplink shared channel (PUSCH) transmissions. In an exemplary use case, these PUSCH transmissions may carry repetitions of a same transport block, thereby resulting in plural PUSCH repetitions comprising an initial PUSCH transmission and at least one (subsequent) PUSCH repetitions.

Even for PUSCH transmissions with flexible timings, this does not prevent same to carry repetitions of a same transport block. Let us consider an example where the scheduled PUSCH transmissions have different length, namely occupy a different number of symbols. Even then, the PUSCH transmissions can carry repetitions of a same transport block, provided the modulation and coding scheme (MCS) is suitably adjusted for each of the PUSCH transmissions.

Nevertheless, the present disclosure shall not be understood as being limited to transport block repetitions only. For this, the present disclosure refers to PUSCH transmissions in general, namely without any restrictions upon the transport blocks which are carried therein. Numerous alternative use cases are also conceivable, for example, were the scheduled PUSCH transmissions are partly used for transport block repetitions and for one-shot transmissions.

Referring to FIG. 7, a sequence diagram is depicted of a user equipment (UE) performing plural PUSCH transmissions according to a first generic scenario, namely where the user equipment 410 performs plural PUSCH transmissions which do not comprise different numbers of symbols for the front-loaded DMRS carried therein.

Having established that the user equipment 410 is to perform plural PUSCH transmissions, it receives (see, e.g., step 710—FIG. 7) a single (e.g., one) uplink grant. The uplink grant is suitable for scheduling the plurality of PUSCH transmissions. The uplink grant is received from base station 460 which is scheduling transmissions on the uplink, namely over the physical uplink shared channel (PUSCH). For example, this reception operation may be performed by the UL Grant receiver 520-*a* of FIG. 5.

The user equipment 410 receives the uplink grant comprising an antenna port field with an index value. This index value may be used for numerous purposes in the user equipment 410, for example, for indicating the antenna port(s) over which the PUSCH transmissions are to be carried out. In other words, this index value is to be used for the plurality of PUSCH transmission which are scheduled by the uplink grant.

In light of 3GPP terminology, the described uplink grant comprising an antenna port field can imply the signaling of a downlink control information (DCI) format 0-1. For an exhaustive description of the DCI format 0-1, reference is made to section 7.3.1.1.2 of 3GPP technical specification TS 38.212 in v.15.5.0, which is incorporated by reference herein. Moreover, the other (alternative) format for conveying a dynamic uplink grant in 3GPP systems, namely DCI format 0-0 does not comprise an antenna port field, as all PUSCH transmission are to exclusively use the pre-configured port with number 0.

Also in light of 3GPP terminology, the described uplink grant comprising an antenna port field can alternatively imply the signaling of ConfiguredGrantConfig information element (IE). For an exhaustive description of the ConfiguredGrantConfig IE, reference is made to section 6.3.2 of 3GPP technical specification TS 38.331 in v.15.5.0 titled "Radio Resource Control (RRC) protocol specification (Release 15)" which is incorporated herein by reference. As apparent from the ASN.1 notation, not all of the ConfiguredGrantConfig IEs comprise an antenna port field, as it is comprised in a sequence of fields witch are designated as being optional to the IE.

Based on the received uplink grant, the user equipment 410 determines (see, e.g., step 720—FIG. 7) time-domain resources to be used for the plural PUSCH transmissions. Generally, the determined time-domain resources for each PUSCH transmission shall be understood as a number of contiguous symbols designated for the uplink transmissions. For example, this determining operation may be performed by the time-domain resources determining processing circuitry 530-*a*.

In more detail, the determined time domain resources are prescribing a number (e.g., maximum or total) of PUSCH transmissions that are being scheduled with the uplink grant, and are prescribing a length (e.g., in symbols) of each of the number of PUSCH transmissions. The time-domain resources have been allocated in advance by the base station 460 for utilization by the user equipment 410.

In an exemplary implementation, the determined time-domain resources may also prescribe a location of at least one, namely of the first, or of all of the number of PUSCH transmissions. Such location may be prescribed, for instance, in terms of a (relative) slot offset and a (absolute) symbol number specifying the start within a slot. Alternatively, such locations may be inferred (for instance in a technical specification) in form of contiguous PUSCH transmissions, namely where a last symbol of a preceding PUSCH transmission is directly followed by a first symbol of a subsequent PUSCH transmission.

Nevertheless, in the context of the present disclosure, it is sufficient for the user equipment 410 can (actually) determine time domain resource which are to be used for plural PUSCH transmissions based on the received uplink grant. In other words, the present disclosure is not restricted to any of the following exemplary implementation.

In another exemplary implementation, the user equipment 410 may determine the time-domain resources by reference to a radio resource control, RRC, configured table. Particular, an indication to a specific row of this RRC configured table may be signaled via a dynamic or configured uplink grant, namely by reference to an index value from a time-domain resource assignment field comprised in such a dynamic or configured uplink grant.

In case of a dynamic uplink grant, the mechanism of this implementation can best be summarized as follows:

The user equipment 410 receives a PUSCH config information element, IE, in form of RRC signaling, namely where the PUSCH config IE being applicable to a particular bandwidth part. Then the user equipment 410 configures a table which is defined by a PUSCH time domain resource allocation list IE carried in the received PUSCH config IE. The table comprises rows, each with a value indicating a PUSCH mapping type, a value K2 indicating a slot offsets, and a value SLIV indicating a start and length indicator. Thereafter, the user equipment 410, receives DCI in form of MAC signaling carrying a time-domain resource assignment filed with value m, wherein the value m provides a row index m+1 to the RRC configured table.

With this, the user equipment 410 is capable of determining time-domain resources for at least one PUSCH transmissions based on: a number of a slot carrying the received DCI, and the value K2 indicating the slot offsets, and the value SLIV indicating the start and length indicator comprised in indexed row of the RRC configured table.

The mechanism of this exemplary implementation does not (explicitly) prescribe how the number of plural PUSCH transmissions is being conveyed to the user equipment 410. For this, different refinements to the mechanism are currently under active discussion, all with an aim to permit the user equipment 410 to (deterministically) characterize time-domain resources for plural PUSCH transmissions.

In one refinement of the exemplary implementation, it is assumed that the DCI not only carries the time-domain resource assignment filed but also carries an (explicit) indication of the (total) number of PUSCH transmissions which are being scheduled by the base station 460.

With this indication of the number of PUSCH transmissions, the user equipment 410 can determine the respective time-domain resources with the underlying assumption that the determined time-domain resources for a first PUSCH transmission are directly followed (contiguous) by time-domain resources for all subsequent PUSCH transmission, the (total) number of which is corresponding to the indicated number of PUSCH transmissions.

In particular, the user equipment 410 may uses the same parameters of the indexed row of the RRC configured table to determine the time-domain resources not only of the first PUSCH transmission but also the time-domain resources for all subsequent PUSCH transmissions such that they are arranged contiguously in time-domain. For instance, this implies that all time-domain resource may have the same length of symbols and are contiguously arranged within one or across plural slots.

In another refinement of the exemplary implementation, it is assumed that the PUSCH config information element, IE, not only carries time-domain resource allocations for a single PUSCH transmission but also such allocations for all subsequent PUSCH transmissions which are being scheduled by the base station 460.

With such time-domain resource allocations, the user equipment 410 can infer the (total) number of PUSCH transmissions from the number of distinct time-domain resource allocations which are, for instance, comprised in the RRC configured table. Then, by way of the index, the user equipment 410 can infer, with reference to the indexed row of the RRC configure table, the (total) number PUSCH transmissions and also determine the time-domain domain resources for same transmissions.

In more detail, the indexed row of the RRC configured table may comprise plural SLIV values corresponding to the distinct time-domain resources which are arranged within one or across plural slots. Since each SLIV value is indicating a start and length of time-domain resources in terms of symbols, there is no necessity for the time-domain resources to be contiguously arranged in time-domain. Rather, the start and length of each time-domain resource may independently be configured.

In a further refinement of the exemplary implementation, it is assumed that the user equipment 410, when determining the time-domain resources, further (actively) adapts the time-domain resource allocations which are signaled from the base station 460. Such adaptation may become necessary to handle (or cope with) side-effects which may result from dynamic reconfigurations of the underlying slot format (UL/DL).

In other words, all the above described mechanisms are based on time-domain resource allocations which are semi-statically configured (in advance) through RRC. And, it will not be possible to reflect all conceivable slot formats in advance. Thus, a dynamically indicated change of slot format may necessitate an adaptation of the semi-statically configured time-domain resource allocations, namely when determining time-domain resources which can (actually) be used for the PUSCH transmissions.

One possibility of conflict may result from the signaling of a changed slot format which is designating a symbol of a slot to change from UL to DL. Provided this symbols was previously intended for use as part of the indicated time-domain resource allocations, its designated change from UL to DL will result in a conflict which has be handled (or coped with) at the side of the user equipment.

Such conflict may be resolved by the user equipment shifting the signaled time-domain resource allocations such that the determined time-domain resources only occupy the newly designated UL symbols of the slot.

Another possibility of conflict may result from the signaling of a changed slot format which is designating fewer symbols of a slot as UL and more symbols as DL. Then, even if the individual time-domain resource allocations are not affected by the change in slot format, a situation may occur where the indicated time-domain resource allocations are distributed across multiple slots. In particular, in case the signaled time-domain resource allocation pertaining to a single PUSCH transmission is distributed across multiple slots (crosses the slot boundary), then this will result in a conflict which again has to be handled (or coped with) at the side of the user equipment, as PUSCH transmissions crossing slot boundaries are not allowed.

Such conflict may be resolved by the user equipment segmenting the affected PUSCH transmission at the slot boundary into two (contiguous) PUSCH transmissions which are no longer crossing the slot boundary.

Notably, due to this segmentation, the user equipment 410 will have to transmit a higher number of PUSCH transmissions than what it has been scheduled with by the uplink grant.

Assuming for the sake of example that the user equipment 410 receives an uplink grant which is scheduling three (3) PUSCH transmissions. Provided one (1) of these PUSCH transmissions is segmented due to a crossing of the slot boundary, then this one (1) affected PUSCH transmission will result actually in two (2) PUSCH transmissions, namely one (1) PUSCH transmission for the segment before the slot boundary and a further one (1) PUSCH transmission for the segment after the slot boundary. Then, the received uplink grant will result in the user equipment 410 determining time-domain resources for a total number of four (4) PUSCH transmissions.

In summary, there exist multiple conceivable implementations which permit the user equipment 410 to determine time domain resource which are to be used for plural PUSCH transmissions based on the received uplink grant. Nevertheless, the present disclosure shall not be understood as being restricted to any of these exemplary implementations.

After having determined the time-domain resources for a (possibly higher) number of PUSCH transmissions based on the received uplink grant, the user equipment 410 composes the PUSCH transmissions for their subsequent transmission. Each of the number of PUSCH transmissions comprises at least one front-loaded demodulation reference signal (DMRS) in order to enable a coherent demodulation of the PUSCH transmission.

In this context, the user equipment 410 determines (see, e.g., step 730—FIG. 7) a number of symbols (e.g., single-symbol or double-symbol) to be used for the front-loaded DMRS of each of the PUSCH transmissions. For this, the user equipment 410 determines the number of symbols based on the received index value which is carried in the antenna port field of the single uplink grant. For example, this determination operation may be performed by a number of symbols for DMRS determining processing circuitry 530-*b*.

Emphasis is laid on the fact that the present disclosure focuses on a situation where different numbers of symbols are permissible to be used for each of the front loaded DMRS. In other words, the present disclosure does not consider a situation where only single-symbol DMRS can be used (are allowed) as front-loaded DMRS but instead considers a situation where both, single-symbol and double-symbol DMRS can be used (are allowed) as front-loaded DMRS.

It is generally understood that, when compared with single-symbol DMRS, the double-symbol DMRS enable a higher accuracy for the channel estimation to be performed. This facilitates achieving better results for the coherent demodulation of the PUSCH transmissions. In particular, double-symbol DMRS have been introduces with the motivation to cope with highly time variant and/or frequency selective radio channels. Moreover, the double-symbol DMRS have also been recognized to provide for superior detection results, namely avoiding misdetections, of PUSCH transmissions which are scheduled by a configured grant.

Nevertheless, the use of such higher number of symbols for the front-loaded DMRS comes at the expense of a reduced throughput on the per PUSCH transmission basis. In case a PUSCH transmission is scheduled with a certain length, then a decision of whether or not to use double-symbol DMRS may reduce the symbols which can carry the payload in form of a transport block. Thus, this decision is left to the base station, namely for it to decide, under given radio channel conditions, whether it is necessary that the user equipment uses double-symbol DMRS for a PUSCH transmission or whether it is sufficient for it to use single-symbol DMRS for same PUSCH transmissions.

There are two different steps before a user equipment 410 actually knows whether for certain PUSCH transmissions, it is to use double-symbol DMRS or whether it is to use single-symbol DMRS.

In a first step, the user equipment 410 is signaled an indication indicating whether or not the use of different numbers of symbols is (generally) permitted for PUSCH transmissions. This indication is subsequently used when determining the (actual) number of symbols to be used as front-loaded DMRS comprise in each of the PUSCH transmissions.

For example, this indication may configures (e.g., in the 'Yes' case) the user equipment 410 so that it can use either one of double-symbol or single-symbol DMRS for all future PUSCH transmissions. In other words, this configuration merely prescribes the (general) availability of double-symbol DMRS for PUSCH transmissions. It does not require that the double-symbol DMRS are actually used. Further to this example, this indication may configure (e.g., in the 'No' case) the user equipment 410 so that it can only use single-symbol DMRS for PUSCH transmissions.

In a second step, the user equipment determines for each front-loaded DMRS of the number of PUSCH transmissions the (actual) number of symbols to be used. This determination is based on the index value carried in the antenna port field comprised in the received uplink grant. In this regard, since the index value is carried in the received uplink grant, it is directly linked to the respective number of PUSCH transmissions.

In an exemplary implementation, the user equipment 410 is provided with a configuration prescribing the maximum number of symbols which are permitted to be used as front-loaded DMRS. In case the maximum number of symbols is 'two,' the usage of either one of double-symbol DMRS or single-symbol DMRS is permitted.

In another exemplary implementation, the user equipment 410 determines the number of symbols to be used for the front-loaded DMRS of each of the number of PUSCH transmissions. For this, the user equipment 410 refers to its configuration of the maximum number of symbols and based thereon, it selects a corresponding table, for instance, in case of maxLength=2 the table 7.3.1.1.2-7 of TS 38.212 v.15.5.0, as described above. Then, the user equipment 410 uses the received index value from the antenna port field of the uplink grant to determine correspondingly indexed row of the selected table and then, extracts from the fourth column of this indexed row the number of symbols to be use for each of the front loaded DMRS of the number of PUSCH transmissions.

Now emphasis is laid on the fact that the present disclosure focusses on a situation where the number of PUSCH transmissions have different lengths, namely where the time-domain resources determined based on the uplink grant are prescribing different lengths for at least two of the number of PUSCH transmissions.

Under this condition, it has been recognized that a correct functioning of the scheduling of plural PUSCH transmission can no longer be ensured. Rather, in case the determined uplink-resources prescribe different lengths of PUSCH transmissions, then it cannot be ensured that the determined (single) number of symbols—as it does not distinguish between individual PUSCH transmissions—is suitable to prescribe the usage of DMRS for each of the (plural) number of PUSCH transmissions with different lengths.

In an exemplary implementation, the user equipment 410 uses the determined (single) number of symbols to select a corresponding table for the PUSCH mapping, for instance, in case of intra-slot frequency hopping disabled, and a determined number of symbols of 'one' the Table 6.4.1.1.3-3 of TS 38.211 in v.15.5.0, and in case of intra-slot frequency hopping disabled, and a determined number of symbols of 'two' the Table 6.4.1.1.3-4 of TS 38.211 in v.15.5.0, which has been described above. From these tables, the user equipment 410 infers the positions of the DMRS in the respective PUSCH.

As soon as the number of PUSCH transmissions have not a same (single) lengths but has two different lengths, situations may occur that the mapping of the DMRS, namely its positions in the respective PUSCH transmissions is undefined (or unspecified, non-conformant).

This directly follows from the observation that the length (or duration) of the PUSCH transmission (first column in the above tables) is determining the position of DMRS in the PUSCH transmissions (second to ninth column in the above tables). And certain mappings of double-symbol DMRS are not defined for shorter lengths (or durations) of PUSCH transmissions. Then the ambiguity between a (single) index value and (plural) different lengths PUSCH transmissions may—at worst—result in an undefined (or unspecified, non-conformant) mapping of DMRS to the different lengths PUSCH transmissions.

From this, it can be recognized that a correct functioning of the scheduling of plural PUSCH transmission cannot be ensured under the conditions that different numbers of symbols (or double-symbol) DMRS are permissible and that the scheduled PUSCH transmissions have different lengths.

In order to ensure a correct functioning of the scheduling of plural PUSCH transmissions, the user equipment 410 transmits (see, e.g., 740—FIG. 7) the same (prescribed) or a smaller number of PUSCH transmissions using the same (determined) or a subset of the time-domain resources of the received uplink grant. Specifically, this transmission operation is carried out such that none of the comprised at least one front-loaded DMRS uses (plural) different numbers of symbols. For example, this transmission operation may be performed by PUSCH transmissions transmitter 520-b.

Even with the focus of the present disclosure on a situation where the number of PUSCH transmissions have different lengths, it is the solution of the first generic scenario to resolve the situation where the correct functioning of the scheduling of PUSCH cannot be ensured, by the user equipment 410 transmitting the same or a smaller number of PUSCH transmissions with the constraint that for none of the comprised at least one front-loaded DMRS a different determined number of symbols is used.

In other words, albeit the user equipment is operating under a condition where different numbers of symbols are permissible to be used for each of the front-loaded DMRS and the received uplink grant is processed with a same objective, namely to permit further usage of DMRS with symbols of different numbers (e.g., the user equipment explicitly due to maxLength=2 the table 7.3.1.1.2-7 of TS 38.212 v.15.5.0) it is expressly required that the user equipment 410 transmits only PUSCH transmission which do not comprise front-loaded DMRS that use different numbers of symbols. Thereby, the ambiguity between the (single) uplink grant signaling from the base station and a corresponding transmission of (plural) PUSCH transmissions can be resolved.

In an exemplary embodiment, the user equipment 410 determines the number of symbols to be used for each of the at least one front-loaded DMRS based on the different lengths of all of the number of PUSCH transmissions. For instance, this may require the user equipment 410 to not only determine the (single) number of symbols based on the received index value, but additionally compares this (single) value with the (e.g., maximum) number of symbols which is required for each of the different lengths PUSCH transmissions to avoid an undefined (or unspecified, non-conformant) mapping of DMRS to the different lengths PUSCH transmissions. If the comparison indicates a conflict, then the user equipment 410 needs to re-determine the number of symbols to be used (now) based on the different lengths of all of the number of PUSCH transmissions.

The above description has been given from the perspective of the user equipment 410. This shall, however, not be understood as a limitation to the present disclosure. The base station 460 equally performs the first generic scenario disclosed herein.

Again the focus shall be laid on the assumption that base station 460 is to schedule plural physical uplink shared channel (PUSCH) transmissions. In an exemplary use case, these PUSCH transmissions may carry repetitions of a same transport block, thereby resulting in plural PUSCH repetitions comprising an initial PUSCH transmission and at least one (subsequent) PUSCH repetitions.

Referring to FIG. 8, a sequence diagram is depicted of a base station (BS) receiving plural PUSCH transmissions according to a first generic scenario, namely where the base station 460 receives plural PUSCH transmissions which do not comprise different numbers of symbols for the front-loaded DMRS carried therein.

In this context, the base station 460 determines (see, e.g., step 810—FIG. 8) time-domain resources, the determined time-domain resources prescribing a number of plural PUSCH transmissions and a length of each of the number of PUSCH transmissions. For example, this determination operation may be performed by the time-domain resources determining processing circuitry 680-*a*.

The base station 460 determines (see, e.g., step 820—FIG. 8) a number of symbols to be used for each of the at least one front-loaded DMRS comprised in the number of PUSCH transmissions, the determined number of symbols being one of a lower number and a higher number of symbols. For example, this determination operation may be performed by the number of symbols for DMRS determining processing circuitry 680-*b*.

In case at least two of the number of PUSCH transmissions have different lengths, and in case one of the at least two of the number of PUSCH transmissions cannot comprise a higher number of symbols for each of the at least one front-loaded DMRS, the base station 460 determines (see again step 820—FIG. 8) the index value which is associated with the lower number of symbols from the determined numbers of symbols, to be used for each of the comprised at least one front-loaded DMRS. For example, this determination operation may be performed by the index value determining processing circuitry 680-*d*.

Thereafter, the base station 460 transmits (see, e.g., step 830—FIG. 8) a single uplink grant based on the determined time-domain resources for the number of PUSCH transmissions, the single uplink grant comprising an antenna port field with the determined index value that is to be used for the number of PUSCH transmissions. For example, this transmission operation may be performed by the uplink grant transmitter 670-*a*.

And the base station 460 receives (see, e.g., step 840—FIG. 8) the number of PUSCH transmissions using the determined time-domain resources, each of the number of PUSCH transmissions comprising at least one front-loaded demodulation reference signal, DMRS.

For sake of brevity, the operation of the base station is kept rather short. This, however, shall not be understood as a restriction. Rather, a skilled readier readily understands that same or similar considerations which have expressly been described for the user equipment find equal application in the operation of the base station, namely when it is scheduling of plural PUSCH transmissions with a signal uplink grant.

Also here it has been recognized that a correct functioning of the scheduling of plural PUSCH transmission can no longer be ensured.

Thus, it is the solution of the first generic scenario to resolve this situation (where the correct functioning of the scheduling of PUSCH cannot be ensured), when the base station 460 determines the index value which is associated with the lower number of symbols from the determined numbers of symbols, to be used for each of the comprised at least one front-loaded DMRS.

Thereby, it can be ensured that the base station 460 receives the same or a smaller number of PUSCH transmissions with the constraint that for none of the comprised at least one front-loaded DMRS a different determined number of symbols is used.

First Exemplary Implementation

Figure 9:
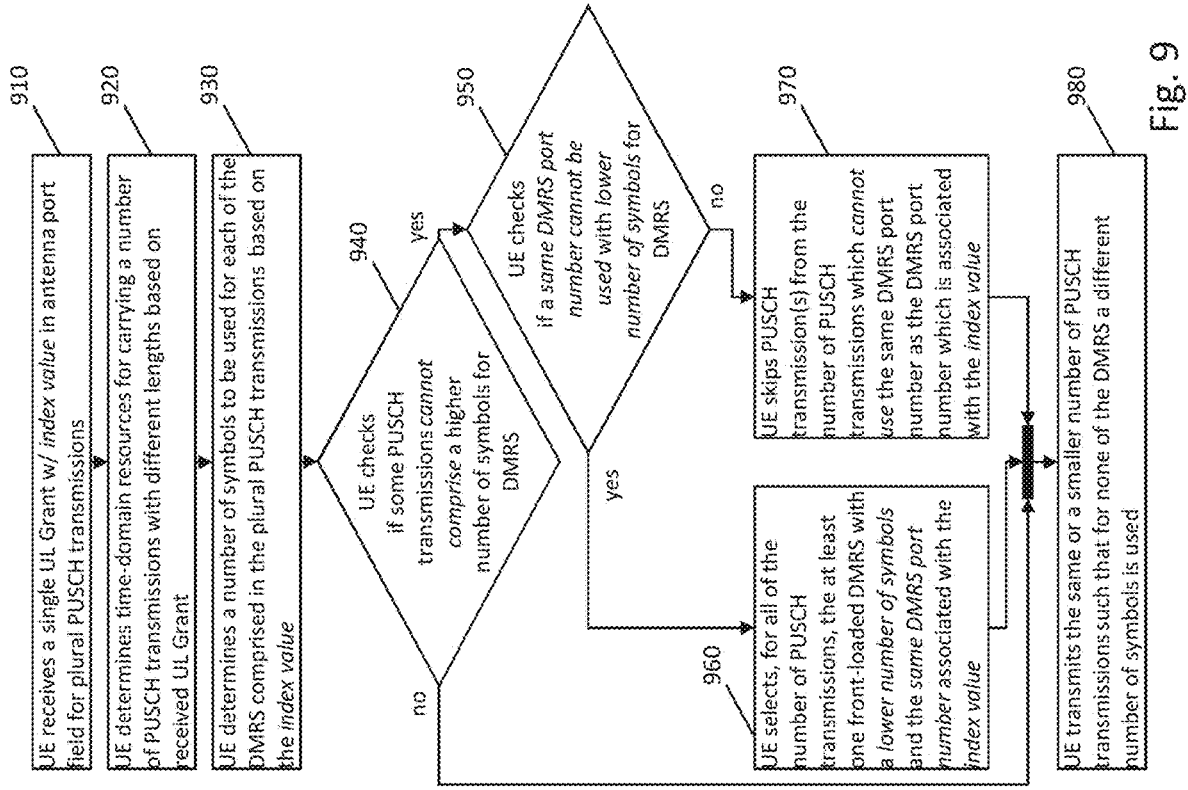

The following first exemplary implementation is provided to give a more detailed description of the operation of user equipment 410 according to the first generic scenario, namely where the user equipment 410 performs plural PUSCH transmissions which do not comprise different numbers of symbols for the front-loaded DMRS carried therein. Reference is made to FIG. 9, which show a sequence diagram of the user equipment 410 performing plural PUSCH transmissions according to the first exemplary implementation of the first generic mechanism.

This description is given with the assumption that different numbers of symbols are permissible to be used (e.g., maxLength=2) for each of the front loaded DMRS. In other words, the present disclosure does not consider a situation where only a single-symbol DMRS can be used (are allowed) as front-loaded DMRS but instead considers a situation where both, single-symbol and double-symbol DMRS can be used (are allowed) as front-loaded DMRS.

Having established that the user equipment 410 is to perform plural PUSCH transmissions, it receives (see, e.g., step 910—FIG. 9) a single (e.g., one) uplink grant. The uplink grant is conveyed to schedule the plurality of PUSCH transmissions. The uplink grant is received from base station 460 which is scheduling transmissions on the uplink, namely over the physical uplink shared channel (PUSCH).

Based on the received uplink grant, the user equipment 410 determines (see, e.g., step 920—FIG. 9) time-domain resources to be used for the plural PUSCH transmissions. Generally, the determined time-domain resources for each PUSCH transmission shall be understood as a number of contiguous symbols designated for the uplink transmissions.

The present disclosure shall again focus on a situation where the scheduled number of PUSCH transmissions have different lengths, namely where the time-domain resources determined based on the uplink grant are prescribing different lengths for at least two of the number of PUSCH transmissions.

In this context, the user equipment 410 determines (see, e.g., step 930—FIG. 9) a number of symbols (e.g., single-symbol or double-symbol) to be used for the front-loaded DMRS of each of the PUSCH transmissions. For this, the user equipment 410 determines the number of symbols based on the received index value which is carried in the antenna port field of the single uplink grant.

For this, the user equipment 410 exemplarily refers to its configuration of the maximum number of symbols and based thereon, it selects a corresponding table, for instance, in the present case of maxLength=2 the table 7.3.1.1.2-7 of TS 38.212 v.15.5.0, as described above. Then, the user equipment 410 uses the received index value from the antenna port field of the uplink grant to determine correspondingly indexed row of the selected table and then, extracts from the fourth column of this indexed row the number of symbols to be used for each of the front loaded DMRS of the number of PUSCH transmissions.

Subsequently, the user equipment checks (see, e.g., step 940—FIG. 9) if one of the at least two of the number of PUSCH transmissions cannot comprise a higher number of symbols for each of the at least one front-loaded DMRS.

For this, the user equipment 410 uses the determined (single) number of symbols to select a corresponding table for the PUSCH mapping, for instance, in case of intra-slot frequency hopping disabled, and a determined number of symbols of 'one' the Table 6.4.1.1.3-3 of TS 38.211 in v.15.5.0, and in case of intra-slot frequency hopping disabled, and a determined number of symbols of 'two' the Table 6.4.1.1.3-4 of TS 38.211 in v.15.5.0, which has been described above. From these tables, the user equipment 410 infers the positions of the DMRS in the respective PUSCH.

In particular, the user equipment 410 determines whether for the different lengths (or durations) of each of the PUSCH transmissions (first column in the above tables) a mapping or position of DMRS in the PUSCH transmissions (second to ninth column in the above tables) is defined (case 'no' in step 940) or is undefined (case 'yes' of step 940). This determination operation is based on the general understanding that certain mappings of double-symbol DMRS are undefined (or unspecified, non-conformant) for shorter lengths (or durations) of PUSCH transmissions.

Having established that the determined number of symbols for DMRS would result for at least one of the number of PUSCH transmissions in an undefined (case 'yes' in step 940) mapping (or position) of DMRS, the user equipment provisionally selects (not expressly shown in FIG. 9), for all of the number of PUSCH transmissions, the at least one front-loaded DMRS with a lower number of symbols (single-symbol DMRS). This provisional selection of the lower number of symbols, however, has to be confirmed as it could entail the change of the DMRS ports to be used.

For this reason, the user equipment 410 checks (see, e.g., step 950—FIG. 9) if a same DMRS port cannot be used with the provisionally selected lower number of symbols to be used for the at least one front-loaded DMRS of all of the number of PUSCH transmissions. In other words, the index value carried in the antenna port field determines not only the number of symbols of DMRS but also the DMRS port to be used for all of the PUSCH transmissions. And to avoid any conflicts, it has to be ensured that with the provisionally selected number of symbols can also be used for the same DMRS port determined based on the index value.

For this, the user equipment 410 exemplarily refers to the correspondingly selected table, again in the present case of maxLength=2 the table 7.3.1.1.2-7 of TS 38.212 v.15.5.0, as described above. From this table, the user equipment 410 determines the DMRS port (see, e.g., column 3 in same Table) which is indicated with the index value (see, e.g., column 1 in same table) carried in the antenna port field of the received uplink grant. Thereafter, the user equipment checks if the provisionally selected lower number of symbols (single-symbol DMRS) can also be used with the same DMRS port (see DMRS ports 0-3 in rows 2-5 of same table), namely with a same DMRS port number.

In case this check is affirmative (case 'yes' in step 950), then the user equipment 410 has established that even though a different, lower number of symbols has been selected, this lower number of symbols can be used for the front-loaded DMRS of all of the number of PUSCH transmissions over the same DMRS port which is indicated through the uplink grant, and over which the base station 460 expects to receive the PUSCH transmissions.

In this regard, when selecting the at least one front-loaded DMRS, the user equipment 410 selects (see, e.g., step 960—FIG. 9) for all of the number of PUSCH transmissions the at least one front-loaded DMRS such that:

the lower number of symbols is used, and
a same DMRS port number is used, where the DMRS port number to be used for all of the at least one front-loaded DMRS is same as the DMRS port number which is associated with the received index value.

This outcome is exemplified in FIGS. 11-13.

For example, according to table 7.3.1.1.2-7 of TS 38.212 v.15.5.0, for antenna ports mapping for DMRS configuration type with maximum length of 2 symbols, if any if the index values 4, 5, 6 or 7 are indicated that are associated with 2-symbol length DMRS, then the corresponding possible index that are associated and can be used for 1-symbol length DMRS are 0, 1, 2 or 3, respectively.

Further, in case this check is dissenting (case 'no' in step 950), then the user equipment 410 has established that the provisionally selected different lower number of symbols cannot be used. This provisionally selected lower number of symbols cannot be used over a DMRS port which is same as the DMRS port that is determined based on the index value. In other word, for the number of PUSCH transmissions, this would require different DMRS ports to be used.

In other words, the DMRS port which is indicated through the uplink grant, and over which the base station 460 expects to receive the PUSCH transmissions cannot be used with the provisionally selected lower number of symbols for DMRS.

In this regard, when selecting the at least one front-loaded DMRS, the user equipment 410 skips (see, e.g., step 970—FIG. 9) at least one PUSCH transmission from the number of PUSCH transmissions:

which cannot comprise a higher number of symbols for each of the at least one front-loaded DMRS, and
which cannot use the same DMRS port number as the DMRS port number which is associated with the received index value.

Then, the user equipment 410 transmits (see, e.g., step 980—FIG. 9) the smaller number of PUSCH transmissions such that, for the not-skipped, remaining of the number of PUSCH transmissions, the higher number of symbols and the same DMRS port number is used.

In summary, the user equipment 410 transmits the same (see case 'yes' in step 950) or a smaller (see case 'no' in step 950) number of PUSCH transmissions using the same (determined) or a subset of the time-domain resources determined based on the received uplink grant. In particular, this transmission is carried out such that none of the comprised at least one front-loaded DMRS uses (plural) different numbers of symbols.

The above description of the first exemplary implementation has been given from the perspective of the user equipment 410. This shall, however, not be understood as a limitation to the present disclosure. The base station 460 equally performs the first exemplary implementation disclosed herein, namely where the base station 460 receives plural PUSCH transmissions which do not comprise different numbers of symbols for the front-loaded DMRS carried therein.

Figure 10:
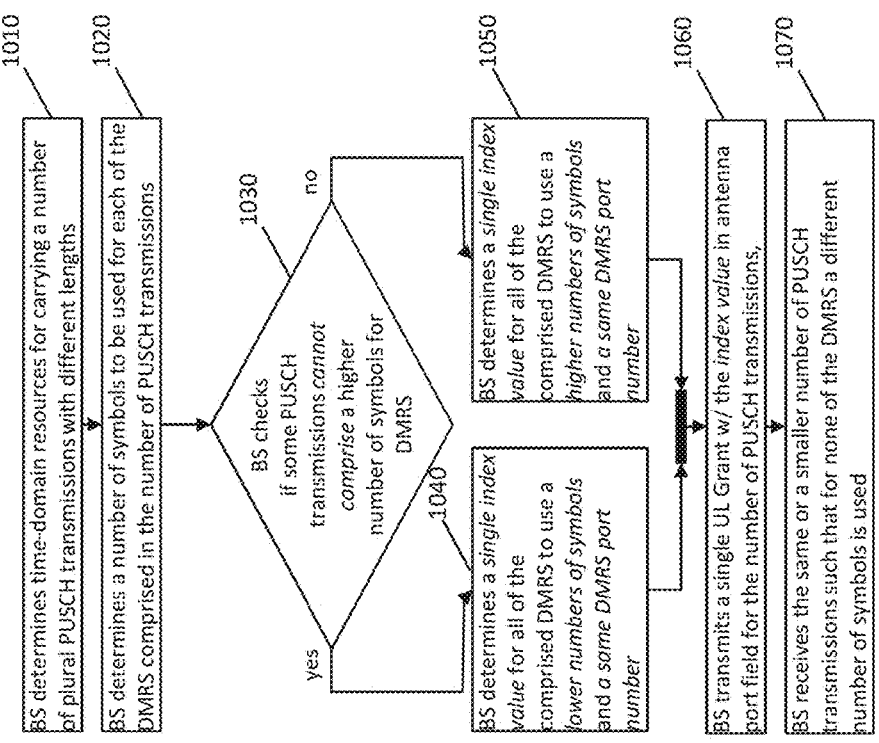
FIGS. 9-10 show a sequence diagram of a user equipment (UE) and of a base station (BS) performing plural PUSCH transmissions according to a first exemplary implementation of the first generic mechanism.

Reference is made to FIG. 10, which show a sequence diagram of the base station 460 scheduling plural PUSCH transmissions according to the first exemplary implementation of the first generic mechanism. In an exemplary use case, these PUSCH transmissions may carry repetitions of a same transport block, thereby resulting in plural PUSCH repetitions comprising an initial PUSCH transmission and at least one (subsequent) PUSCH repetitions.

In this context, the base station 460 determines (see, e.g., step 1010—FIG. 10) time-domain resources, the determined time-domain resources prescribing a number of plural PUSCH transmissions and a length of each of the number of PUSCH transmissions.

The present disclosure shall again focus on a situation where the scheduled number of PUSCH transmissions have different lengths, namely where the time-domain resources are prescribing different lengths for at least two of the number of PUSCH transmissions.

The base station 460 determines (see, e.g., step 1020—FIG. 10) a number of symbols to be used for each of the at least one front-loaded DMRS comprised in the number of PUSCH transmissions, the determined number of symbols being one of a lower number and a higher number of symbols.

Then, the base station 460 checks (see, e.g., step 1030—FIG. 10) if one of the number of PUSCH transmissions cannot comprise a higher number of symbols for each of the at least one front-loaded DMRS.

For this, the base station 460 uses the determined (single) number of symbols to select a corresponding table for the PUSCH mapping, for instance, in case of intra-slot frequency hopping disabled, and a determined number of symbols of 'one' the Table 6.4.1.1.3-3 of TS 38.211 in v.15.5.0, and in case of intra-slot frequency hopping disabled, and a determined number of symbols of 'two' the Table 6.4.1.1.3-4 of TS 38.211 in v.15.5.0, which has been described above. From these tables, the user equipment 410 infers the positions of the DMRS in the respective PUSCH.

In particular, the base station 460 determines whether for the different lengths (or durations) of each of the PUSCH transmissions (first column in the above tables) a mapping or position of DMRS in the PUSCH transmissions (second to ninth column in the above tables) is defined (case 'no' in step 1030) or is undefined (case 'yes' of step 1030). This determination operation is based on the general understanding that certain mappings of double-symbol DMRS undefined (or unspecified, non-conformant) for shorter lengths (or durations) of PUSCH transmissions.

Having established that the determined number of symbols for DMRS would result for at least one of the number of PUSCH transmissions in an undefined (case 'yes' in step 1030) mapping (or position) of DMRS, the base station 460 selects (not expressly shown in FIG. 10), for all of the number of PUSCH transmissions, the at least one front-loaded DMRS with a lower number of symbols (single-symbol DMRS).

Having established that the determined number of symbols for DMRS will result for all of the number of PUSCH transmissions in a defined (case 'no' in step 1030) mapping (or position) of DMRS, the base station 460 selects (not expressly shown in FIG. 10), for all of the number of PUSCH transmissions, the at least one front-loaded DMRS with a higher number of symbols (single-symbol DMRS).

Then, the base station 460 determines the index value which is associated with the lower number of symbols (see, e.g., step 1040—FIG. 10), or the index value which is associated with the higher number of symbols (see, e.g., step 1050—FIG. 10), to be used in all of the number of PUSCH transmissions, namely for each of the comprised at least one front-loaded DMRS. The determined index value is also associate with a same DMRS port.

Thereafter, the base station 460 transmits (see, e.g., step 1060—FIG. 10) a single uplink grant based on the determined time-domain resources for the number of PUSCH transmissions, the single uplink grant comprising an antenna port field with the determined index value that is to be used for the number of PUSCH transmissions.

And the base station 460 receives (see, e.g., step 1070—FIG. 10) the number of PUSCH transmissions using the determined time-domain resources, each of the number of PUSCH transmissions comprising at least one front-loaded demodulation reference signal, DMRS.

For sake of brevity, the operation of the base station is kept rather short. This, however, shall not be understood as a restriction. Rather, a skilled readier readily understands that same or similar considerations which have expressly been described for the user equipment find equal application in the operation of the base station, namely when it is scheduling of plural PUSCH transmissions with a signal uplink grant.

Second Generic Scenario

Figure 14:
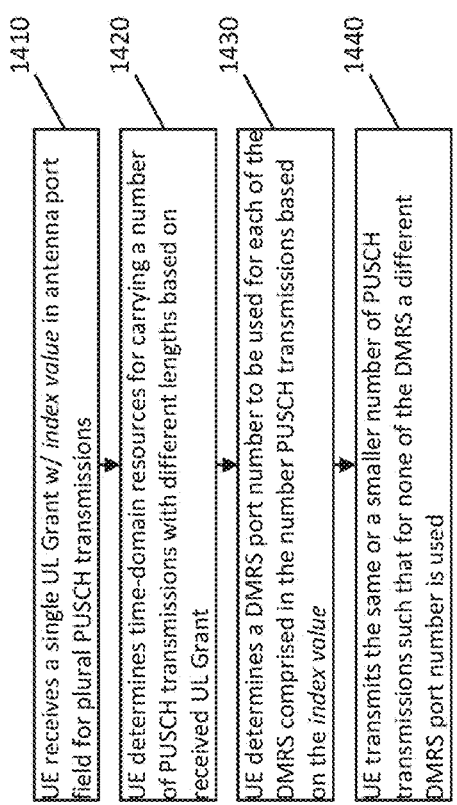

Referring now to FIG. 14, a sequence diagram is depicted of a user equipment (UE) performing plural PUSCH transmissions according to a second generic scenario, namely where the user equipment 410 performs plural PUSCH transmissions which may comprise different numbers of symbols for the front-loaded DMRS carried therein, however, for none of which different DMRS port numbers are used.

According to the general understanding, DMRS ports have to be consistently used for the transmission and reception operations of the plural PUSCH transmissions. In other words, the front-loaded DMRS of the PUSCH transmissions have to use a consistent DMRS port (e.g., same DMRS port number) which is indicated through the uplink grant, and over which the reception is expected. Without such consistency, the reception of the plural PUSCH transmissions would not be successful since the DMRS comprised therein could not contribute to an accurate channel estimation and hence, to a coherent demodulation on the receiver side.

For this reason, the second generic scenario facilitates avoiding such inconsistencies, namely for the case that plural PUSCH transmissions are scheduled with different lengths, and that different numbers of symbols for DMRS (e.g., single-symbol or double-symbol DMRS) are permissible for the front-loaded DMRS carried therein.

Having established that the user equipment 410 is to perform plural PUSCH transmissions, it receives (see, e.g., step 1410—FIG. 14) a single (e.g., one) uplink grant. The uplink grant is suitable for scheduling the plurality of PUSCH transmissions. The uplink grant is received from base station 460 which is scheduling transmissions on the uplink, namely over the physical uplink shared channel (PUSCH). For example, this reception operation may be performed by the UL Grant receiver 520-a of FIG. 5.

The user equipment 410 receives the uplink grant comprising an antenna port field with an index value. This index value may be used for numerous purposes in the user equipment 410, for example, for indicating the antenna port(s) over which the PUSCH transmissions are to be carried out. In other words, this index value is to be used for the plurality of PUSCH transmission which are scheduled by the uplink grant.

In light of 3GPP terminology, the described uplink grant comprising an antenna port field can imply the signaling of a downlink control information (DCI) format 0-1. For an exhaustive description of the DCI format 0-1, reference is made to section 7.3.1.1.2 of 3GPP technical specification TS 38.212 in v.15.5.0, which is incorporated by reference herein. Moreover, the other (alternative) format for conveying a dynamic uplink grant in 3GPP systems, namely DCI format 0-0 does not comprise an antenna port field, as all PUSCH transmission are to exclusively use the pre-configured port with number 0.

Also in light of 3GPP terminology, the described uplink grant comprising an antenna port field can alternatively imply the signaling of ConfiguredGrantConfig information element (IE). For an exhaustive description of the ConfiguredGrantConfig IE, reference is made to section 6.3.2 of 3GPP technical specification TS 38.331 in v.15.5.0 titled "Radio Resource Control (RRC) protocol specification (Release 15)" which is incorporated herein by reference. As apparent from the ASN.1 notation, not all of the ConfiguredGrantConfig IEs comprise an antenna port field, as it is comprised in a sequence of fields witch are designated as being optional to the IE.

Based on the received uplink grant, the user equipment 410 determines (see, e.g., step 1420—FIG. 14) time-domain resources to be used for the plural PUSCH transmissions. Generally, the determined time-domain resources for each PUSCH transmission shall be understood as a number of contiguous symbols designated for the uplink transmissions. For example, this determining operation may be performed by the time-domain resources determining processing circuitry 530-*a*.

In more detail, the determined time domain resources are prescribing a number (e.g., maximum or total) of PUSCH transmissions that are being scheduled with the uplink grant, and are prescribing a length (e.g., in symbols) of each of the number of PUSCH transmissions. The time-domain resources have been allocated in advance by the base station 460 for utilization by the user equipment 410.

In an exemplary implementation, the determined time-domain resources may also prescribe a location of at least one, namely of the first, or of all of the number of PUSCH transmissions. Such location may be prescribed, for instance, in terms of a (relative) slot offset and a (absolute) symbol number specifying the start within a slot. Alternatively, such locations may be inferred (for instance in a technical specification) in form of contiguous PUSCH transmissions, namely where a last symbol of a preceding PUSCH transmission is directly followed by a first symbol of a subsequent PUSCH transmission.

Nevertheless, in the context of the present disclosure, it is sufficient for the user equipment 410 can (actually) determine time domain resource which are to be used for plural PUSCH transmissions based on the received uplink grant. In other words, the present disclosure is not restricted to any of the exemplary implementation described above for the first generic scenario.

All the above described mechanisms are based on time-domain resource allocations which are semi-statically configured (in advance) through RRC. And, it will not be possible to reflect all conceivable slot formats in advance. Thus, a dynamically indicated change of slot format may necessitate an adaptation of the semi-statically configured time-domain resource allocations, namely when determining time-domain resources which can (actually) be used for the PUSCH transmissions.

One possibility of conflict may result from the signaling of a changed slot format which is designating a symbol of a slot to change from UL to DL. Provided this symbols was previously intended for use as part of the indicated time-domain resource allocations, its designated change from UL to DL will result in a conflict which has be handled (or coped with) at the side of the user equipment.

Such conflict may be resolved by the user equipment shifting the signaled time-domain resource allocations such that the determined time-domain resources only occupy the newly designated UL symbols of the slot.

Another possibility of conflict may result from the signaling of a changed slot format which is designating fewer symbols of a slot as UL and more symbols as DL. Then, even if the individual time-domain resource allocations are not affected by the change in slot format, a situation may occur where the indicated time-domain resource allocations are distributed across multiple slots. In particular, in case the signaled time-domain resource allocation pertaining to a single PUSCH transmission is distributed across multiple slots (crosses the slot boundary), then this will result in a conflict which again has to be handled (or coped with) at the side of the user equipment, as PUSCH transmissions crossing slot boundaries are not allowed.

Such conflict may be resolved by the user equipment segmenting the affected PUSCH transmission at the slot boundary into two (contiguous) PUSCH transmissions which are no longer crossing the slot boundary.

Notably, due to this segmentation, the user equipment 410 will have to transmit a higher number of PUSCH transmissions than what it has been scheduled with by the uplink grant.

Assuming for the sake of example that the user equipment 410 receives an uplink grant which is scheduling three (3) PUSCH transmissions. Provided one (1) of these PUSCH transmissions is segmented due to a crossing of the slot boundary, then this one (1) affected PUSCH transmission will result actually in two (2) PUSCH transmissions, namely one (1) PUSCH transmission for the segment before the slot boundary and a further one (1) PUSCH transmission for the segment after the slot boundary. Then, the received uplink grant will result in the user equipment 410 determining time-domain resources for a total number of four (4) PUSCH transmissions.

In summary, there exist multiple conceivable implementations which permit the user equipment 410 to determine time domain resource which are to be used for plural PUSCH transmissions based on the received uplink grant. Nevertheless, the present disclosure shall not be understood as being restricted to any of these exemplary implementations.

After having determined the time-domain resources for a (possibly higher) number of PUSCH transmissions based on the received uplink grant, the user equipment 410 composes the PUSCH transmissions for their subsequent transmission. Each of the number of PUSCH transmissions comprises at least one front-loaded demodulation reference signal (DMRS) in order to enable a coherent demodulation of the PUSCH transmission.

In this context, the user equipment 410 determines (see, e.g., step 1430—FIG. 14) a DMRS port number (e.g., DMRS port number 0-7 for a type 1 configuration or DMRS port number 0-11 for a type 2 configuration) to be used for the front-loaded DMRS of each of the PUSCH transmissions. For this, the user equipment 410 determines the DMRS port number based on the received index value which is carried in the antenna port field of the single uplink grant. For example, this determination operation may be performed by a DMRS port number for DMRS determining processing circuitry 530-*c*.

Emphasis is laid on the fact that the present disclosure focuses on a situation where different numbers of symbols are permissible to be used for each of the front loaded DMRS. In other words, the present disclosure does not consider a situation where only single-symbol DMRS can be used (are allowed) as front-loaded DMRS but instead considers a situation where both, single-symbol and double-symbol DMRS can be used (are allowed) as front-loaded DMRS.

There are two different steps before a user equipment 410 actually knows whether for certain PUSCH transmissions, it is to use double-symbol DMRS or whether it is to use single-symbol DMRS. In a first step, the user equipment 410 is signaled an indication indicating whether or not the use of different numbers of symbols is (generally) permitted for PUSCH transmissions. This indication is subsequently used when determining the (actual) number of symbols to be used as front-loaded DMRS comprise in each of the PUSCH transmissions.

In an exemplary implementation, the user equipment 410 is provided with a configuration prescribing the maximum number of symbols which are permitted to be used as front-loaded DMRS. In case the maximum number of symbols is 'two,' the usage of either one of double-symbol DMRS or single-symbol DMRS is permitted.

In a second step, the user equipment determines for each front-loaded DMRS of the number of PUSCH transmissions the (actual) number of symbols to be used. This determination is based on an index value carried in the antenna port field comprised in the received uplink grant. In this regard, since the index value is carried in the received uplink grant, it is directly linked to the respective number of PUSCH transmissions.

The permissible numbers of symbols (see the first step described above) also has an influence on the determination of the DMRS port number.

When different numbers of symbols are permissible for the front-loaded DMRS, then each of the different numbers of symbols in combination with a separate DMRS port number has to be separately indicatable from the base station 460 to the user equipment 410. For this purpose, the index value conveyed within the uplink grant permits, in the case of the permissible different numbers of symbols, an unambiguous indication of the (actual) number of symbols to be used for the front-loaded DMRS.

At the same time, the index value not only indicates the (actual) number of symbols to be used for the front-loaded DMRS, Rather, it indicates in combination the number of symbols for the front-loaded DMRS and the DMRS port number to be used for the DMRS comprised in the number of PUSCH transmissions.

Now, if different numbers of symbols are permissible, then the index value only efficiently achieves an unambiguous indication of the (actual) number of symbols to be used when it organizes the different index value so that a same DMRS port number is index able for all of the different numbers of symbols which are permissible for the DMRS. Otherwise, the DMRS ports could not be used with both of the permitted different numbers of symbols.

In an exemplary implementation, the user equipment 410 determines the DMRS port number for the front-loaded DMRS of each of the number of PUSCH transmissions. For this, the user equipment 410 refers to its configuration of the maximum number of symbols and based thereon, it selects a corresponding table, for instance, in case of maxLength=2 the Table 7.3.1.1.2-7 of TS 38.212 v.15.5.0, as described above. Then, the user equipment 410 uses the received index value from the antenna port field of the uplink grant to determine correspondingly indexed row of the selected table and then, extracts from the third column of this indexed row the DMRS port number to be use for each of the front-loaded DMRS of the number of PUSCH transmissions.

Also the influence of the permissible number of symbols can also be seen in Table 7.3.1.1.2-7 of TS 38.212 v.15.5.0, as described above. This table is devised for the case that different numbers of symbols are permissible, namely for the case maxLength=2. Thus, each of the index values (first column of the table) is associated in an unambiguous manner with the (actual) number of symbols to be used for the front loaded DMRS (fourth column of the table). At the same time, each of the index values (first column of the tables) is also associated in an unambiguous manner with the DMRS port number (third column of the table).

Moreover, since the different DMRS ports identified by number can be used for front-loaded DMRS of all of the different numbers of symbols, the different DMRS port numbers 0-3 are may both be used for single-symbol DMRS (see row two to five of the table) as well as for double-symbol DMRS (see row six to nine of the table). Only the DMRS port numbers 4-7 may only be used for the double-symbol DMRS (see row ten to thirteen of the table).

Hence, the permissible numbers of symbols has a substantial influence on the determination of the DMRS port number in that it not only prescribes the table to be used but also prescribes a situation that at least some of the DRMS port numbers (e.g., DMRS port number 0-3 in the above table) are index able with two different index values, namely for each of the (actual) numbers of symbols which are permitted.

Now emphasis is laid on the fact that the present disclosure focusses on a situation where the number of PUSCH transmissions have different lengths, namely where the time-domain resources determined based on the uplink grant are prescribing different lengths for at least two of the number of PUSCH transmissions.

Under this condition, it has been recognized that a correct functioning of the scheduling of plural PUSCH transmission can no longer be ensured. Rather, in case the determined uplink-resources prescribe different lengths of PUSCH transmissions, then it cannot be ensured that the determined (single) number of symbols—as it does not distinguish between individual PUSCH transmissions—is suitable to prescribe the usage of DMRS for each of the (plural) number of PUSCH transmissions with different lengths.

In an exemplary implementation, the user equipment 410 uses the determined (single) number of symbols to select a corresponding table for the PUSCH mapping, for instance, in case of intra-slot frequency hopping disabled, and a determined number of symbols of 'one' the Table 6.4.1.1.3-3 of TS 38.211 in v.15.5.0, and in case of intra-slot frequency hopping disabled, and a determined number of symbols of 'two' the Table 6.4.1.1.3-4 of TS 38.211 in v.15.5.0, which has been described above. From these tables, the user equipment 410 infers the positions of the DMRS in the respective PUSCH.

As soon as the number of PUSCH transmissions have not a same (single) lengths but has two different lengths, situations may occur that the mapping of the DMRS, namely its positions in the respective PUSCH transmissions is undefined (or unspecified, non-conformant).

This directly follows from the observation that the length (or duration) of the PUSCH transmission (first column in the above tables) is determining the position of DMRS in the PUSCH transmissions (second to ninth column in the above tables). And certain mappings of double-symbol DMRS are not defined for shorter lengths (or durations) of PUSCH transmissions. Then the ambiguity between a (single) index value and (plural) different lengths PUSCH transmissions may—at worst—result in an undefined (or unspecified, non-conformant) mapping of DMRS to the different lengths PUSCH transmissions.

From this, it can be recognized that a correct functioning of the scheduling of plural PUSCH transmission cannot be ensured under the conditions that different numbers of symbols (or double-symbol) DMRS are permissible and that the scheduled PUSCH transmissions have different lengths.

In order to ensure a correct functioning of the scheduling of plural PUSCH transmissions, the user equipment 410 transmits (see, e.g., 1440—FIG. 14) the same (prescribed) or a smaller number of PUSCH transmissions using the same (determined) or a subset of the time-domain resources of the uplink grant. Specifically, this transmission operation is carried out such that none of the comprised at least one front-loaded DMRS uses (plural) different DMRS port numbers. For example, this transmission operation may be performed by PUSCH transmissions transmitter 520-*b*.

Even with the focus of the present disclosure on a situation where the number of PUSCH transmissions have different lengths, it is the solution of the second generic scenario to resolve the situation where the correct functioning of the scheduling of PUSCH cannot be ensured, by the user equipment 410 transmitting the same or a smaller number of PUSCH transmissions with the constraint that for none of the comprised at least one front-loaded DMRS a different determined DMRS port number is used.

Albeit the user equipment is operating under a condition where different numbers of symbols are permissible to be used for each of the front-loaded DMRS and the received uplink grant is processed with a same objective, namely to permit further usage of DMRS with symbols of different numbers (e.g., the user equipment explicitly due to maxLength=2 the table 7.3.1.1.2-7 of TS 38.212 v.15.5.0) it is expressly required that the user equipment 410 transmits only PUSCH transmission which do not comprise front-loaded DMRS that use different DMRS port numbers.

In other words, this second generic scenario tries to achieve the objective, namely to permit further usage of DMRS with symbols of different numbers, however has realized that not all the different DMRS port numbers can be used with all of the different permissible numbers of symbols (e.g., in the table 7.3.1.1.2-7 of TS 38.212 v.15.5.0 with maxLength=2, DMRS ports 0-3 can be used with both, single-symbol DMRS and double-symbol DMRS, where DMRS ports 4-7 can only be used with double-symbol DMRS).

Accordingly, a situation is prevented where some of the number of PUSCH transmissions, for instance, with a higher number of symbols for DMRS, use a DMRS port number (e.g., DMRS ports 4-7 in the above table) which is different from a DMRS port number (e.g., DMRS ports 0-3 in the above table) which is used for other of the number of PUSCH transmissions, for instance, with a lower number of symbols for DMRS. In other words, although in this second generic scenario different numbers of symbols for DMRS are generally permitted among the number of PUSCH transmissions, it is ensured that a same DMRS port is being used for all of the number of PUSCH transmissions which also corresponds to the DMRS port which is indicated through the index value of the antenna port field carried in the (single) uplink grant.

Thereby, the ambiguity between the (single) uplink grant signaling from the base station and a corresponding transmission of (plural) PUSCH transmissions can be resolved.

In an exemplary embodiment, the user equipment 410 determines the DMRS port number to be used for each of the at least one front-loaded DMRS based on the different lengths of all of the number of PUSCH transmissions. For instance, this may require the user equipment 410 to not only determine the (single) DMRS port number based on the received index value, but additionally compares this (single) DMRS port number, and the correspondingly indexed number of symbols with the (e.g., maximum) number of symbols which is required for each of the different lengths PUSCH transmissions to avoid an undefined (or unspecified, non-conformant) mapping of DMRS to the different lengths PUSCH transmissions. If the comparison indicates a conflict, then the user equipment 410 needs to re-determine the DMRS port number to be used (now) based on the different lengths of all of the number of PUSCH transmissions.

The above description has been given from the perspective of the user equipment 410. This shall, however, not be understood as a limitation to the present disclosure. The base station 460 equally performs the second generic scenario disclosed herein.

Again the focus shall be laid on the assumption that base station 460 is to schedule plural physical uplink shared channel (PUSCH) transmissions. In an exemplary use case, these PUSCH transmissions may carry repetitions of a same transport block, thereby resulting in plural PUSCH repetitions comprising an initial PUSCH transmission and at least one (subsequent) PUSCH repetitions.

Figure 15:
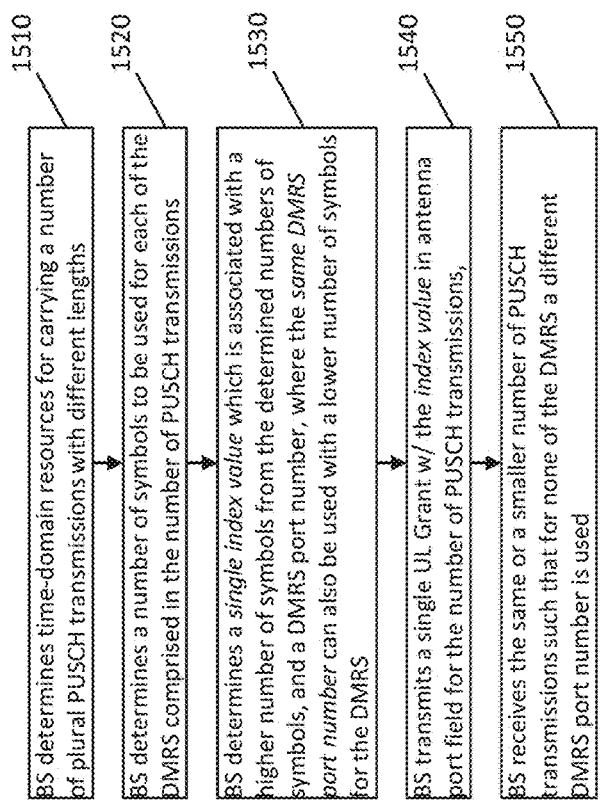
FIGS. 14-15 illustrates a sequence diagram of a user equipment (UE) and of a base station (BS) performing plural PUSCH transmissions according to a second generic mechanism.

Referring to FIG. 15, a sequence diagram is depicted of a base station (B S) receiving plural PUSCH transmissions according to the second generic scenario, namely where the base station 460 receives plural PUSCH transmissions which do not comprise different DMRS port numbers for the front-loaded DMRS carried therein.

In this context, the base station 460 determines (see, e.g., step 1510—FIG. 15) time-domain resources, the determined time-domain resources prescribing a number of plural PUSCH transmissions and a length of each of the number of PUSCH transmissions. For example, this determination operation may be performed by the time-domain resources determining processing circuitry 680-a.

The base station 460 determines (see, e.g., step 1520—FIG. 15) a number of symbols to be used for each of the at least one front-loaded DMRS comprised in the number of PUSCH transmissions, the determined number of symbols being one of a lower number and a higher number of symbols. For example, this determination operation may be performed by the number of symbols for DMRS determining processing circuitry 680-b.

In case at least two of the number of PUSCH transmissions have different lengths, and in case one of the at least two of the number of PUSCH transmissions cannot comprise a higher number of symbols for each of the at least one front-loaded DMRS, the base station 460 determines (see step 1530—FIG. 15) the index value which is associated with the higher number of symbols from the determined numbers of symbols, and a DMRS port number where the same DMRS port number can also be used for the at least one front-loaded DMRS with the determined lower number of symbols. For example, this determination operation may be performed by the index value determining processing circuitry 680-d.

In an exemplary implementation, the base station 460 determines, in case only some of the PUSCH transmissions cannot comprise higher number of symbols for DMRS, the index value from the Table, for instance, the Table 7.3.1.1.2-7 of TS 38.212 v.15.5.0 with maxLength=2, such that the use a DMRS ports 4-7 is prevented and the use of DMRS ports 0-3 is permitted. Only then the same DMRS port number can be used together higher and lower number of symbols without a non-permissible change of the DMRS ports during the signaling of the number of PUSCH transmissions.

Importantly, since each of the DMRS ports 0-3 can be indicated through different index values, the base station 460 determines the index value to correspond to the higher number of symbols of the number of symbols which, according to, for instance, Table 6.4.1.1.3-3 and Table 6.4.1.1.3-4 of TS 38.211 in v.15.5.0, still permit a mapping (or position) of DMRS for the respective length of each of the number of PUSCH transmissions.

Thereafter, the base station 460 transmits (see, e.g., step 1540—FIG. 15) a single uplink grant based on the determined time-domain resources for the number of PUSCH transmissions, the single uplink grant comprising an antenna port field with the determined index value that is to be used for the number of PUSCH transmissions. For example, this transmission operation may be performed by the uplink grant transmitter 670-a.

And the base station 460 receives (see, e.g., step 1550—FIG. 15) the number of PUSCH transmissions using the determined time-domain resources, each of the number of PUSCH transmissions comprising at least one front-loaded demodulation reference signal, DMRS.

For sake of brevity, the operation of the base station is kept rather short. This, however, shall not be understood as a restriction. Rather, a skilled readier readily understands that same or similar considerations which have expressly been described for the user equipment find equal application in the operation of the base station, namely when it is scheduling of plural PUSCH transmissions with a signal uplink grant.

Also here it has been recognized that a correct functioning of the scheduling of plural PUSCH transmission can no longer be ensured.

Thus, it is the solution of the second generic scenario to resolve this situation (where the correct functioning of the scheduling of PUSCH cannot be ensured), when the base station 460 determines the index value which is associated with the higher number of symbols from the determined numbers of symbols, and a DMRS port number where the same DMRS port number can also be used for the at least one front-loaded DMRS with the determined lower number of symbols.

Thereby, it can be ensured that the base station 460 receives the same or a smaller number of PUSCH transmissions such that for none of the comprised at least one front-loaded DMRS a different determined DMRS port number is used.

Second Exemplary Implementation

Figure 16:
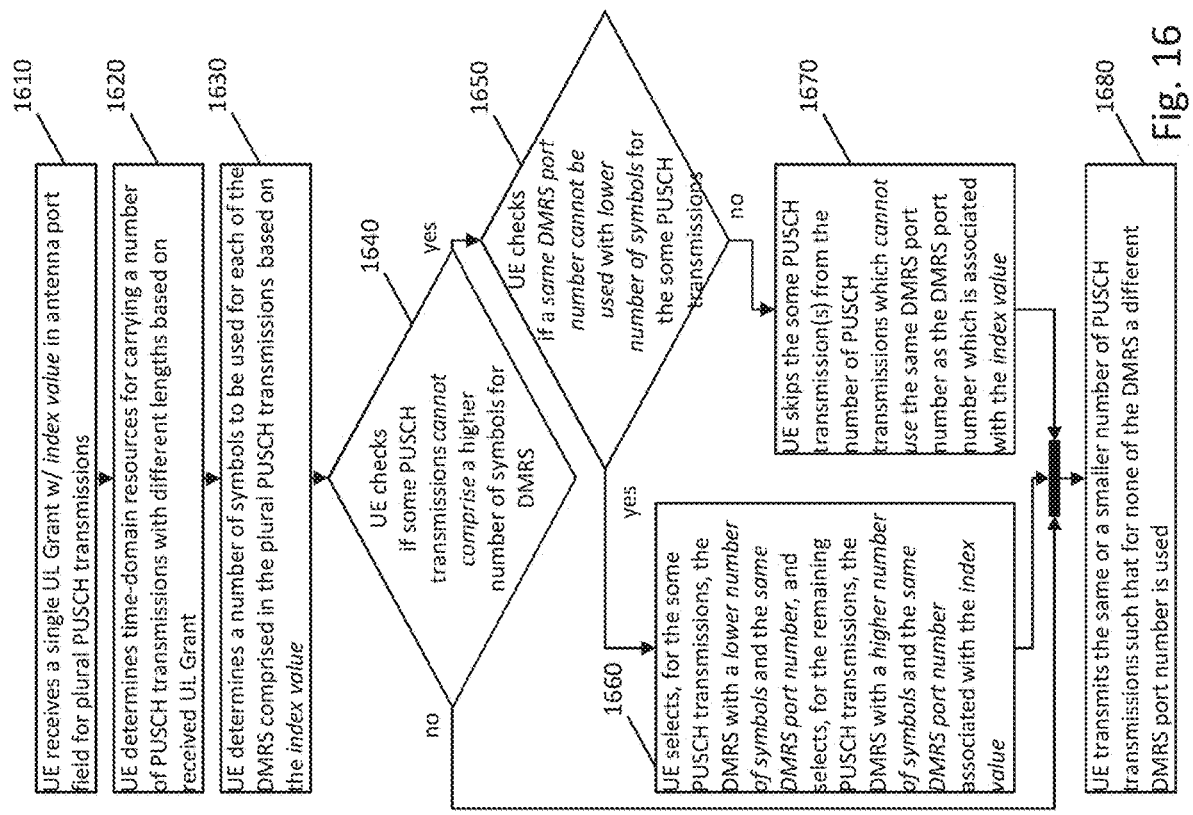

The following second exemplary implementation is provided to give a more detailed description of the operation of user equipment 410 according to the second generic scenario, namely where the user equipment 410 performs plural PUSCH transmissions which do not comprise different DMRS port numbers for the front-loaded DMRS carried therein. Reference is made to FIG. 16, which show a sequence diagram of the user equipment 410 performing plural PUSCH transmissions according to the second exemplary implementation of the second generic mechanism.

This description is given with the assumption that different numbers of symbols are permissible to be used (e.g., maxLength=2) for each of the front loaded DMRS. In other words, the present disclosure does not consider a situation where only a single-symbol DMRS can be used (are allowed) as front-loaded DMRS but instead considers a situation where both, single-symbol and double-symbol DMRS can be used (are allowed) as front-loaded DMRS.

Having established that the user equipment 410 is to perform plural PUSCH transmissions, it receives (see, e.g., step 1610—FIG. 16) a single (e.g., one) uplink grant. The uplink grant is conveyed to schedule the plurality of PUSCH transmissions. The uplink grant is received from base station 460 which is scheduling transmissions on the uplink, namely over the physical uplink shared channel (PUSCH).

Based on the received uplink grant, the user equipment 410 determines (see, e.g., step 1620—FIG. 16) time-domain resources to be used for the plural PUSCH transmissions. Generally, the determined time-domain resources for each PUSCH transmission shall be understood as a number of contiguous symbols designated for the uplink transmissions.

The present disclosure shall again focus on a situation where the scheduled number of PUSCH transmissions have different lengths, namely where the time-domain resources determined based on the uplink grant are prescribing different lengths for at least two of the number of PUSCH transmissions.

In this context, the user equipment 410 determines (see, e.g., step 1630—FIG. 16) a number of symbols (e.g., single-symbol or double-symbol) to be used for the front-loaded DMRS of each of the PUSCH transmissions. For this, the user equipment 410 determines the number of symbols based on the received index value which is carried in the antenna port field of the single uplink grant.

For this, the user equipment 410 exemplarily refers to its configuration of the maximum number of symbols and based thereon, it selects a corresponding table, for instance, in the present case of maxLength=2 the table 7.3.1.1.2-7 of TS 38.212 v.15.5.0, as described above. Then, the user equipment 410 uses the received index value from the antenna port field of the uplink grant to determine correspondingly indexed row of the selected table and then, extracts from the fourth column of this indexed row the number of symbols to be used for each of the front loaded DMRS of the number of PUSCH transmissions.

Subsequently, the user equipment checks (see, e.g., step 1640—FIG. 16) if some (one or more) of the number of PUSCH transmissions cannot comprise a higher number of symbols for each of the at least one front-loaded DMRS.

In this context, the term 'some' shall be understood as indicating a (specific) subset from among all of the number of PUSCH transmissions. This term is consistently used through the reset of this description. For example, the some of the number of PUSCH transmissions, can be a (specific) third PUSCH transmission and not a first and second of the PUSCH transmissions from a total number of three PUSCH transmissions.

For this, the user equipment 410 uses the determined (single) number of symbols to select a corresponding table for the PUSCH mapping, for instance, in case of intra-slot frequency hopping disabled, and a determined number of symbols of 'one' the Table 6.4.1.1.3-3 of TS 38.211 in v.15.5.0, and in case of intra-slot frequency hopping disabled, and a determined number of symbols of 'two' the Table 6.4.1.1.3-4 of TS 38.211 in v.15.5.0, which has been described above. From these tables, the user equipment 410 infers the positions of the DMRS in the respective PUSCH.

In particular, the user equipment 410 determines whether for the different lengths (or durations) of each of the PUSCH transmissions (first column in the above tables) a mapping or position of DMRS in the PUSCH transmissions (second to ninth column in the above tables) is defined (case 'no' in step 1640) or is undefined (case 'yes' of step 1640). This determination operation is based on the general understanding that certain mappings of double-symbol DMRS are undefined (or unspecified, non-conformant) for shorter lengths (or durations) of PUSCH transmissions.

Having established that the determined number of symbols for DMRS would result for some (one or more) of the number of PUSCH transmissions in an undefined (case 'yes' in step 1640) mapping (or position) of DMRS, the user equipment provisionally selects (not expressly shown in FIG. 16), for the some (see above) of the number of PUSCH transmissions, the at least one front-loaded DMRS with a lower number of symbols (single-symbol DMRS). This provisional selection of the lower number of symbols, however, has to be confirmed as it could entail the change of the DMRS ports to be used.

For this reason, the user equipment 410 checks (see, e.g., step 1650—FIG. 16) if a same DMRS port cannot be used with the provisionally selected lower number of symbols to be used for the at least one front-loaded DMRS of the some (see above) of the number of PUSCH transmissions. In other words, the index value carried in the antenna port field determines not only the number of symbols of DMRS but also the DMRS port to be used for the same some (see before) of the number of PUSCH transmissions. And to avoid any conflicts, it has to be ensured that the provisionally selected number of symbols can also be used for the same DMRS port determined based on the index value.

For this, the user equipment 410 exemplarily refers to the correspondingly selected table, again in the present case of maxLength=2 the table 7.3.1.1.2-7 of TS 38.212 v.15.5.0, as described above. From this table, the user equipment 410 determines the DMRS port (see, e.g., column 3 in same Table) which is indicated with the index value (see, e.g., column 1 in same table) carried in the antenna port field of the received uplink grant. Thereafter, the user equipment checks if the provisionally selected lower number of symbols (single-symbol DMRS) can also be used with the same DMRS port (see DMRS ports 0-3 in rows 2-5 of same table), namely with a same DMRS port number.

In case this check is affirmative (case 'yes' in step 1650), then the user equipment 410 has established that even though a different, lower number of symbols has been selected, this lower number of symbols can be used for the front-loaded DMRS of the some (see above) of the number of PUSCH transmissions over the same DMRS port which is indicated through the uplink grant, and over which the base station 460 expects to receive the PUSCH transmissions.

For the remaining (or other) of the number of the PUSCH transmissions, the user equipment 410 non-provisionally selects the number of symbols such that it corresponds to the (single) number of symbols for the front-loaded DMRS which is determined based on the received index value which is carried in the antenna port field of the single uplink grant. In other words, for those of the number of PUSCH transmissions which can comprise a higher number of symbols for DMRS, it also uses the higher number of symbols being indicated in the single uplink grant.

In this regard, when selecting the at least one front-loaded DMRS, the user equipment 410 selects (see, e.g., step 1660—FIG. 16) for all of the number of PUSCH transmissions the at least one front-loaded DMRS such that:
  a lower and a higher number of symbols is used for the at least one front-loaded DMRS, and
  a same DMRS port number is used for the lower and a higher number of symbols,
where the same DMRS port number to be used for all of the at least one front-loaded DMRS is same as the DMRS port number which is associated with the received index value.

This outcome is exemplified in FIGS. 18-20. For example, according to table 7.3.1.1.2-7 of TS 38.212 v.15.5.0, for antenna ports mapping for DMRS configuration type with maximum length of 2 symbols, if any if the index values 4, 5, 6 or 7 are indicated that are associated with 2-symbol length DMRS, then the corresponding possible index that are associated and can be used for 1-symbol length DMRS are 0, 1, 2 or 3, respectively.

Further, in case this check is dissenting (case 'no' in step 1650), then the user equipment 410 has established that the provisionally selected different, lower number of symbols cannot be used. This provisionally selected lower number of symbols cannot be used over a DMRS port which is same as the DMRS port that is determined based on the index value. In other word, for the number of PUSCH transmissions, this would require different DMRS ports to be used.

In other words, the DMRS port which is indicated through the uplink grant, and over which the base station 460 expects to receive the PUSCH transmissions cannot be used with the provisionally selected lower number of symbols for DMRS.

In this regard, when selecting the at least one front-loaded DMRS, the user equipment 410 skips (see, e.g., step 1670—FIG. 16) the some (see above) PUSCH transmission from the number of PUSCH transmissions:
  which cannot comprise a higher number of symbols for each of the at least one front-loaded DMRS, and
  which cannot use the same DMRS port number as the DMRS port number which is associated with the received index value.

Then, the user equipment 410 transmits (see, e.g., step 1680—FIG. 16) a smaller number of PUSCH transmissions such that, for the not-skipped, remaining (or other) of the number of PUSCH transmissions, the higher number of symbols and the same DMRS port number is used.

In summary, the user equipment 410 transmits the same (see case 'yes' in step 1650) or a smaller (see case 'no' in step 1650) number of PUSCH transmissions using the same (determined) or a subset of the time-domain resources determined based on the received uplink grant. In particular, this transmission is carried out such that none of the comprised at least one front-loaded DMRS uses (plural) different DMRS port numbers.

The above description of the second exemplary implementation has been given from the perspective of the user equipment 410. This shall, however, not be understood as a limitation to the present disclosure. The base station 460 equally performs the first exemplary implementation disclosed herein, namely where the base station 460 receives plural PUSCH transmissions which do not comprise different DMRS port numbers for the front-loaded DMRS carried therein.

Figure 17:
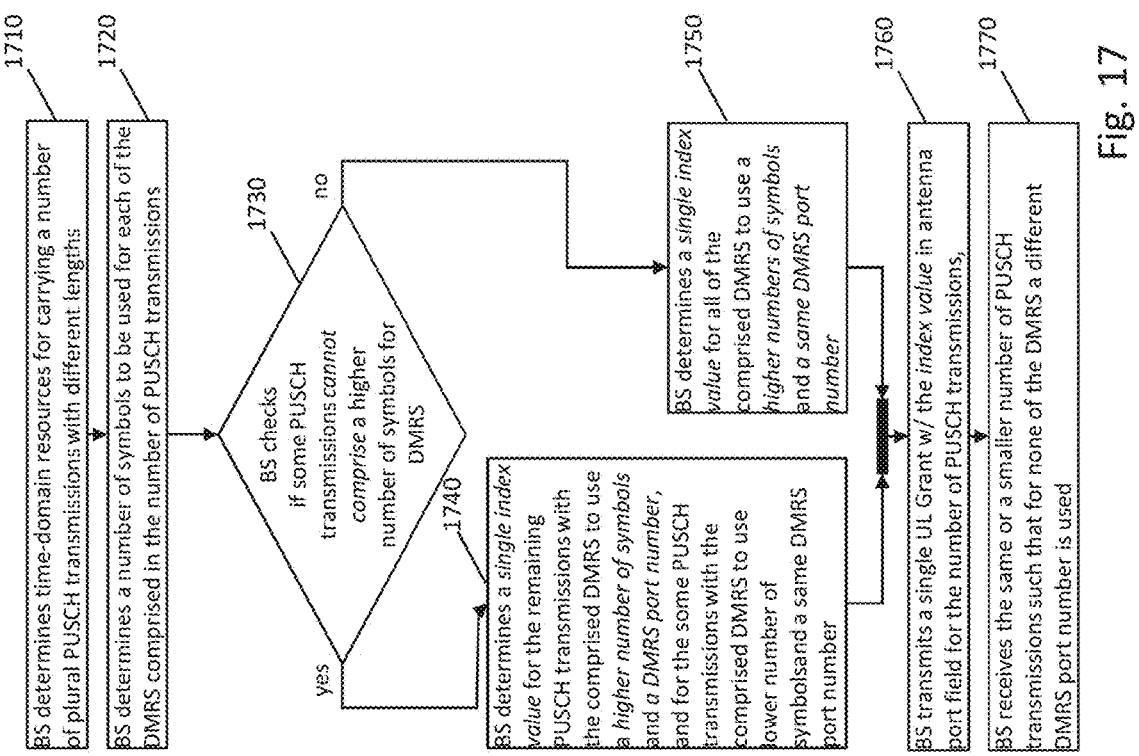
FIGS. 16-17 show a sequence diagram of a user equipment (UE) and of a base station (BS) performing plural PUSCH transmissions according to a second exemplary implementation of the second generic mechanism.

Reference is made to FIG. 17, which show a sequence diagram of the base station 460 scheduling plural PUSCH transmissions according to the second exemplary implementation of the first generic mechanism. In an exemplary use case, these PUSCH transmissions may carry repetitions of a same transport block, thereby resulting in plural PUSCH repetitions comprising an initial PUSCH transmission and at least one (subsequent) PUSCH repetitions.

In this context, the base station 460 determines (see, e.g., step 1710—FIG. 17) time-domain resources, the determined time-domain resources prescribing a number of plural PUSCH transmissions and a length of each of the number of PUSCH transmissions.

The present disclosure shall again focus on a situation where the scheduled number of PUSCH transmissions have different lengths, namely where the time-domain resources are prescribing different lengths for at least two of the number of PUSCH transmissions.

The base station 460 determines (see, e.g., step 1720—FIG. 17) a number of symbols to be used for each of the at least one front-loaded DMRS comprised in the number of PUSCH transmissions, the determined number of symbols being one of a lower number and a higher number of symbols.

Then, the base station 460 checks (see, e.g., step 1730—FIG. 17) if some of the number of PUSCH transmissions cannot comprise a higher number of symbols for each of the at least one front-loaded DMRS.

In this context, the term 'some' shall be understood as indicating a (specific) subset from among all of the number of PUSCH transmissions. This term is consistently used through the reset of this description. For example, the some of the number of PUSCH transmissions, can be a (specific) third PUSCH transmission and not a first and second of the PUSCH transmissions from a total number of three PUSCH transmissions.

For this, the base station 460 uses the determined (single) number of symbols to select a corresponding table for the PUSCH mapping, for instance, in case of intra-slot frequency hopping disabled, and a determined number of symbols of 'one' the Table 6.4.1.1.3-3 of TS 38.211 in v.15.5.0, and in case of intra-slot frequency hopping disabled, and a determined number of symbols of 'two' the Table 6.4.1.1.3-4 of TS 38.211 in v.15.5.0, which has been described above. From these tables, the user equipment 410 infers the positions of the DMRS in the respective PUSCH.

In particular, the base station 460 determines whether for the different lengths (or durations) of each of the PUSCH transmissions (first column in the above tables) a mapping or position of DMRS in the PUSCH transmissions (second to ninth column in the above tables) is defined (case 'no' in step 1730) or is undefined (case 'yes' of step 1730). This determination operation is based on the general understanding that certain mappings of double-symbol DMRS undefined (or unspecified, non-conformant) for shorter lengths (or durations) of PUSCH transmissions.

Having established that the determined number of symbols for DMRS would result for the some (see above) of the number of PUSCH transmissions in an undefined (case 'yes' in step 1730) mapping (or position) of DMRS, the base station 460 selects (not expressly shown in FIG. 17), for these some (see above) of the number of PUSCH transmissions, the at least one front-loaded DMRS with a lower number of symbols (single-symbol DMRS).

Having established that the determined number of symbols for DMRS will result for all of the number of PUSCH transmissions in a defined (case 'no' in step 1730) mapping (or position) of DMRS, the base station 460 selects (not expressly shown in FIG. 17), for all of the number of PUSCH transmissions, the at least one front-loaded DMRS with a higher number of symbols (single-symbol DMRS).

Then, the base station 460 determines the index value (see, e.g., step 1740—FIG. 17) which is associated with the higher number of symbols from the determined number of symbols, and a DMRS port number—in case some PUSCH transmissions were determined (see case 'yes' in step 1730) which cannot comprise the higher number of symbols—where the same DMRS port number can also be used for the at least one front-loaded DMRS with the determined lower number of symbols.

Alternatively, the base station 460 determines (see, e.g., step 1750—FIG. 17) the index value which is associated with the higher number of symbols a same DMRS port to be used in all of the number of PUSCH transmissions, namely for each of the comprised at least one front-loaded DMRS.

Thereafter, the base station 460 transmits (see, e.g., step 1760—FIG. 17) a single uplink grant based on the determined time-domain resources for the number of PUSCH transmissions, the single uplink grant comprising an antenna port field with the determined index value that is to be used for the number of PUSCH transmissions.

And the base station 460 receives (see, e.g., step 1770—FIG. 17) the number of PUSCH transmissions using the determined time-domain resources, each of the number of PUSCH transmissions comprising at least one front-loaded demodulation reference signal, DMRS.

For sake of brevity, the operation of the base station is kept rather short. This, however, shall not be understood as a restriction. Rather, a skilled readier readily understands that same or similar considerations which have expressly been described for the user equipment find equal application in the operation of the base station, namely when it is scheduling of plural PUSCH transmissions with a signal uplink grant.

Third Generic Scenario

According to a third generic scenario, a user equipment and a base station are proposed which are respectively performing and scheduling plural PUSCH transmissions based on a single uplink grant. The operation of the user equipment and base station according to this third generic scenario are not separately depicted, they would have been very similar to what has been shown in FIGS. 7 and 8 for the first generic scenario. Nevertheless, their operation can best be understood from the following description.

The user equipment 410 receives a single uplink grant for a plurality of PUSCH transmissions. The single uplink grant comprising an antenna port field with an index value that is to be used for the plurality of PUSCH transmissions. For example, this reception operation may be carried out by uplink grant receiver 520-a.

Thereafter, the user equipment 410 determines time-domain resources based on the received uplink grant. The determined time-domain resources prescribe a number of PUSCH transmissions and a length of each of the number of PUSCH transmissions. Each of the number of PUSCH transmissions comprises at least one front-loaded demodulation reference signal, DMRS. For example, this determination operation may be carried out by time-domain resources determining processing circuitry 530-b.

In case different numbers of symbols are permissible for each of the at least one front-loaded DMRS, the user equipment 410 performs a specifically adapted transmission operation.

In particular, the user equipment 410 transmits the same number of PUSCH transmissions such that for all of the at least one front-loaded DMRS, the lower number of symbols is used, which is in accordance with received index value, and it does not transmit any of the number of PUSCH transmissions in case the received index value is associated with a higher number of symbols to be used for the at least one front-loaded DMRS. For example, this transmission operation may be performed by the PUSCH transmission transmitter 520-a.

Separately, the base station 460 determines time-domain resources. The determined time-domain resources prescribe a number of plural PUSCH transmissions and a length of each of the number of PUSCH transmissions. For example, this determining operation may be performed by a time-domain resources determining processing circuitry 680-a.

In case a different numbers of symbols are permissible for each of the at least one front-loaded DMRS, the base station 460 then performs a specifically adapted determination operation of an index value.

In particular, the base station determines the index value which is associated with a lower number of symbols such that the same number of PUSCH transmissions are received comprising the at least one front-loaded DMRS using the lower number of symbols. For example, this determining operation may be performed by the index value determining processing circuitry 680-d.

Then, the base station 460 transmits a single uplink grant based on the determined time-domain resources for the number of PUSCH transmissions. The single uplink grant comprising an antenna port field with an index value that is to be used for the number of PUSCH transmissions. For example, this transmission operation may be performed by the uplink grant transmitter 670-*a*.

And the base station 460 receives the number of PUSCH transmissions using the determined time-domain resources, each of the number of PUSCH transmissions comprising at least one front-loaded demodulation reference signal, DMRS. For example, this reception operation may be performed by the PUSCH transmissions receiver 670-*b*.

The present disclosure can be realized by software, hardware, or software in cooperation with hardware.

Each functional block used in the description of each embodiment described above can be partly or entirely realized by an LSI such as an integrated circuit, and each process described in the each embodiment may be controlled partly or entirely by the same LSI or a combination of LSIs.

The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor.

In addition, a FPGA (Field Programmable Gate Array) that can be programmed after the manufacture of the LSI or a reconfigurable processor in which the connections and the settings of circuit cells disposed inside the LSI can be reconfigured may be used.

The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

According to a first aspect, a user equipment, UE, is provided comprising: a receiver, which in operation, receives a single uplink grant for a plurality of PUSCH transmissions, the single uplink grant comprising an antenna port field with an index value that is to be used for the plurality of PUSCH transmissions; a processor, which in operation, determines time-domain resources based on the received uplink grant, the determined time-domain resources prescribing a number of PUSCH transmissions and a length of each of the number of PUSCH transmissions; a transmitter, which in operation, transmits the number of PUSCH transmissions using the determined time-domain resources, each of the number of PUSCH transmissions comprising at least one front-loaded demodulation reference signal, DMRS, wherein the processor, in operation, determines a number of symbols to be used for each of the at least one front-loaded DMRS of the number of PUSCH transmissions based on the received index value, and, in case at least two of the number of PUSCH transmissions have different lengths, and in case different numbers of symbols are permissible for each of the at least one front-loaded DMRS, the transmitter, in operation, transmits the same or a smaller number of PUSCH transmissions such that, for none of the comprised at least one front-loaded DMRS, a different determined numbers of symbols is used.

According to a second aspect, which is provided in addition to the first aspect, the processor, in operation, is configured to use a maximum number of 'two' symbols which permits, for each of the at least one front-loaded DMRS, the use of: a single-symbol DMRS with a lower number of 'one' symbol, or a double-symbol DMRS with a higher number of 'two' symbols.

According to a third aspect, which is provided in addition to either the first or second aspect, the processor, in operation, determines the number of symbols to be used for each of the at least one front-loaded DMRS based on the different lengths of all of the number of PUSCH transmissions.

According to a fourth aspect, which is provided in addition to any of the first through third aspects, in case at least two of the number of PUSCH transmissions have different lengths, and in case one of the at least two of the number of PUSCH transmissions cannot comprise a higher number of symbols for each of the at least one front-loaded DMRS, the processor, in operation and when determining the number of symbols to be used, selects, for all of the number of PUSCH transmissions, the at least one front-loaded DMRS with a lower number of symbols; and the transmitter, in operation, transmits the same number of PUSCH transmissions such that, for all of the at least one front-loaded DMRS, the lower number of symbols is used.

According to a fifth aspect, which is provided in addition to the fourth aspect, the processor, in operation, selects for all of the number of PUSCH transmissions the at least one front-loaded DMRS with the lower number of symbols in case at least one of the number of PUSCH transmission cannot comprise a higher number of symbols for the comprised at least one front-loaded DMRS.

According to a sixth aspect, which is provided in addition to either the fourth or fifth aspect, the processor, in operation and when selecting the at least one front-loaded DMRS, selects for all of the number of PUSCH transmissions the at least one front-loaded DMRS such that: the lower number of symbols is used, and a same DMRS port number is used, where the DMRS port number to be used for all of the at least one front-loaded DMRS is same as the DMRS port number which is associated with the received index value.

According to a seventh aspect, which is provided in addition to any of the fourth through sixth aspect, the processor, in operation and when selecting the at least one front-loaded DMRS, skips at least one PUSCH transmission from the number of PUSCH transmissions: which cannot comprise a higher number of symbols for each of the at least one front-loaded DMRS, and which cannot use the same DMRS port number as the DMRS port number which is associated with the received index value; and the transmitter, in operation, transmits the smaller number of PUSCH transmissions such that, for all of the comprised at least one front-loaded DMRS, the higher number of symbols and the same DMRS port number is used.

According to an eighth aspect, a user equipment, UE, is provided comprising: a receiver, which in operation, receives a single uplink grant for a plurality of PUSCH transmissions, the single uplink grant comprising an antenna port filed with an index value that is to be used for the plurality of PUSCH transmissions; a processor, which in operation, determines time-domain resources based on the received uplink grant, the determined time-domain resources prescribing a number of PUSCH transmissions and a length of each of the number of PUSCH transmissions; a transmitter, which in operation, transmits the number of PUSCH transmissions using the determined time-domain resources, each of the number of PUSCH transmissions comprising at least one front-loaded demodulation reference signal, DMRS, wherein the processor, in operation, determines a DMRS port number to be used for each of the at least one front-loaded DMRS of the number of PUSCH transmissions based on the received index value, and, in case at least two of the number of PUSCH transmissions have different lengths, and in case different numbers of symbols are permissible for each of the at least one front-loaded DMRS, the transmitter, in operation, transmits the same or a smaller number of PUSCH transmissions such that, for none of the comprised at least one front-loaded DMRS, a different determined DMRS port number is used.

According to a ninth aspect, which is provided in addition to the eight aspect, the processor, in operation, is configured to use a maximum number of 'two' symbols for each of the at least one front-loaded DMRS, such that: a DMRS port is used with a number between 'zero' and 'seven' for a type 1 configuration, or a DMRS port is used with a number between 'zero' and 'eleven' for a type 2 configuration.

According to an tenth aspect, which is provided in addition to either the eighth or ninth aspect, the processor, in operation, determines the DMRS port number to be used for each of the at least one front-loaded DMRS based on the different lengths of all of the number of PUSCH transmissions.

According to a eleventh aspect, which is provided in addition to any of the eighth through tenth aspects, the processor, in operation, additionally determines a number of symbols to be used for each of the at least one front-loaded DMRS of the number of PUSCH transmissions based on the received index value, and in case at least two of the number of PUSCH transmissions have different lengths, and in case different numbers of symbols are determined to be used for the at least two of the number of PUSCH transmissions having different lengths, the processor, in operation and when determining the DMRS port number, selects, for all of the number of PUSCH transmissions, a same DMRS port number which can be used for all of the at least one front-loaded DMRS, and the transmitter, in operation, transmits the same number of PUSCH transmissions such that, for all of the comprised at least one front-loaded DMRS, the same DMRS port number is used with the different numbers of symbols.

According to a twelfth aspect, which is provided in addition to the eleventh aspect, the processor, in operation and when selecting the DMRS port number, selects for all of the number of PUSCH transmissions the DMRS port number such that: a lower and a higher number of symbols is used for the at least one front-loaded DMRS, and a same DMRS port number is used for the lower and a higher number of symbols, where the same DMRS port number to be used for all of the at least one front-loaded DMRS is same as the DMRS port number which is associated with the received index value;

According to a thirteenth aspect, which is provided in addition to the twelfth aspect, the processor, in operation and when determining the DMRS port number, skips at least one PUSCH transmission from the number of PUSCH transmissions: which cannot comprise a higher number of symbols for each of the at least one front-loaded DMRS, and which cannot use the same DMRS port number as the DMRS port number which is associated with the received index value; and the transmitter, in operation, transmits the smaller number of PUSCH transmissions such that, for all of the at least one front-loaded DMRS, the higher number of symbols and the same DMRS port number is used.

According to an fourteenth aspect, a user equipment, UE, is provided comprising: a receiver, which in operation, receives a single uplink grant for a plurality of PUSCH transmissions, the single uplink grant comprising an antenna port field with an index value that is to be used for the plurality of PUSCH transmissions; a processor, which in operation, determines time-domain resources based on the received uplink grant, the determined time-domain resources prescribing a number of PUSCH transmissions and a length of each of the number of PUSCH transmissions; a transmitter, which in operation, transmits the number of PUSCH transmissions using the determined time-domain resources, each of the number of PUSCH transmissions comprising at least one front-loaded demodulation reference signal, DMRS, wherein, in case different numbers of symbols are permissible for each of the at least one front-loaded DMRS, the transmitter, in operation, transmits the same number of PUSCH transmissions such that for all of the at least one front-loaded DMRS, the lower number of symbols is used, which is in accordance with received index value, and the transmitter, in operation, does not transmit any of the number of PUSCH transmissions in case the received index value is associated with a higher number of symbols to be used for the at least one front-loaded DMRS.

According to a fifteenth aspect, which is provided in addition an thirteenth aspect, the processor, in operation, is configured to use a maximum number of 'two' symbols which permits, for each of the at least one front-loaded DMRS, the use of: a single-symbol DMRS with a lower number of 'one' symbol, or a double-symbol DMRS with a higher number of 'two' symbols.

According to a sixteenth aspect, a base station, BS, is provided comprising: a processor, which in operation determines time-domain resources, the determined time-domain resources prescribing a number of plural PUSCH transmissions and a length of each of the number of PUSCH transmissions; a transmitter, which in operation, transmits a single uplink grant based on the determined time-domain resources for the number of PUSCH transmissions, the single uplink grant comprising an antenna port field with an index value that is to be used for the number of PUSCH transmissions; a receiver, which in operation, receives the number of PUSCH transmissions using the determined time-domain resources, each of the number of PUSCH transmissions comprising at least one front-loaded demodulation reference signal, DMRS, wherein the processor, in operation, determines a number of symbols to be used for each of the at least one front-loaded DMRS comprised in the number of PUSCH transmissions, the determined number of symbols being one of a lower number and a higher number of symbols, and, in case at least two of the number of PUSCH transmissions have different lengths, and in case one of the at least two of the number of PUSCH transmissions cannot comprise a higher number of symbols for each of the at least one front-loaded DMRS the processor, in operation, determines the index value which is associated with the lower number of symbols from the determined numbers of symbols, to be used for each of the comprised at least one front-loaded DMRS, the receiver, in operation, receives the same or a smaller number of PUSCH transmissions such that, for none of the comprised at least one front-loaded DMRS, a different determined numbers of symbols is used.

According to a seventeenth aspect, a base station, BS, is provided comprising: a processor, which in operation, determines time-domain resources, the determined time-domain resources prescribing a number of plural PUSCH transmissions and a length of each of the number of PUSCH transmissions; a transmitter, which in operation, transmits a single uplink grant based on the determined time-domain resources for the number of PUSCH transmissions, the single uplink grant comprising an antenna port field with an index value that is to be used for the number of PUSCH transmissions; a receiver, which in operation, receives the number of PUSCH transmissions using the determined time-domain resources, each of the number of PUSCH transmissions comprising at least one front-loaded demodulation reference signal, DMRS, wherein the processor, in operation, determines a number of symbols to be used for each of the at least one front-loaded DMRS comprised in the number of PUSCH transmissions, the determined number of symbols being one of a lower number and a higher number of symbols, and, in case at least two of the number of PUSCH transmissions have different lengths, in case different numbers of symbols are permissible for each of the at least one front-loaded DMRS, the processor, in operation, determines the index value which is associated with the higher number of symbols from the determined number of symbols, and a DMRS port number where the same DMRS port number can also be used for the at least one front-loaded DMRS with the determined lower number of symbols, the receiver, in operation, receives the same or a smaller number of PUSCH transmissions such that, for none of the comprised at least one front-loaded DMRS, a different determined DMRS port number is used.

According to a eighteenth aspect, a base station, BS, is provided comprising: a processor, which in operation, determines time-domain resources, the determined time-domain resources prescribing a number of plural PUSCH transmissions and a length of each of the number of PUSCH transmissions; a transmitter, which in operation, transmits a single uplink grant based on the determined time-domain resources for the number of PUSCH transmissions, the single uplink grant comprising an antenna port field with an index value that is to be used for the number of PUSCH transmissions; a receiver, which in operation, receives the number of PUSCH transmissions using the determined time-domain resources, each of the number of PUSCH transmissions comprising at least one front-loaded demodulation reference signal, DMRS, wherein, in case different numbers of symbols are permissible for each of the at least one front-loaded DMRS, the processor, in operation, determines the index value which is associated with a lower number of symbols such that the same number of PUSCH transmissions are received comprising the at least one front-loaded DMRS using the lower number of symbols.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment (UE) comprising:
   a receiver, which in operation, receives a single uplink grant for a plurality of physical uplink shared channel (PUSCH) transmissions, the single uplink grant comprising an antenna port field with an index value that is to be used for the plurality of PUSCH transmissions;
   a processor, which in operation, determines time-domain resources based on the received uplink grant, the determined time-domain resources prescribing a number of PUSCH transmissions and a length of each of the number of PUSCH transmissions;
   a transmitter, which in operation, transmits the number of PUSCH transmissions using the determined time-domain resources, each of the number of PUSCH transmissions comprising at least one front-loaded demodulation reference signal (DMRS),
   wherein
   the processor, in operation, determines a number of symbols to be used for each of the at least one front-loaded DMRS of the number of PUSCH transmissions based on the received index value,
   and, in case at least two of the number of PUSCH transmissions have different lengths, and in case different numbers of symbols are permissible for each of the at least one front-loaded DMRS,
   the transmitter, in operation, transmits the same or a smaller number of PUSCH transmissions such that, for none of the comprised at least one front-loaded DMRS, a different determined numbers of symbols is used.

2. The UE according to claim 1, wherein:
the processor, in operation, is configured to use a maximum number of 'two' symbols which permits, for each of the at least one front-loaded DMRS, the use of:
a single-symbol DMRS with a lower number of 'one' symbol, or
a double-symbol DMRS with a higher number of 'two' symbols.

3. The UE according to claim 1, wherein:
the processor, in operation, determines the number of symbols to be used for each of the at least one front-loaded DMRS based on the different lengths of all of the number of PUSCH transmissions.

4. The UE according to claim 1, wherein:
in case at least two of the number of PUSCH transmissions have different lengths, and in case one of the at least two of the number of PUSCH transmissions cannot comprise a higher number of symbols for each of the at least one front-loaded DMRS,
the processor, in operation and when determining the number of symbols to be used, selects, for all of the number of PUSCH transmissions, the at least one front-loaded DMRS with a lower number of symbols; and
the transmitter, in operation, transmits the same number of PUSCH transmissions such that, for all of the at least one front-loaded DMRS, the lower number of symbols is used;
and/or
the processor, in operation, selects for all of the number of PUSCH transmissions the at least one front-loaded DMRS with the lower number of symbols in case at least one of the number of PUSCH transmission cannot comprise a higher number of symbols for the comprised at least one front-loaded DMRS.

5. The UE according to claim 4, wherein:
the processor, in operation and when selecting the at least one front-loaded DMRS, selects for all of the number of PUSCH transmissions the at least one front-loaded DMRS such that:
the lower number of symbols is used, and
a same DMRS port number is used,
where the DMRS port number to be used for all of the at least one front-loaded DMRS is same as the DMRS port number which is associated with the received index value;
and/or
the processor, in operation and when selecting the at least one front-loaded DMRS, skips at least one PUSCH transmission from the number of PUSCH transmissions:
which cannot comprise a higher number of symbols for each of the at least one front-loaded DMRS, and
which cannot use the same DMRS port number as the DMRS port number which is associated with the received index value; and
the transmitter, in operation, transmits the smaller number of PUSCH transmissions such that, for all of the comprised at least one front-loaded DMRS, the higher number of symbols and the same DMRS port number is used.

6. A user equipment (UE) comprising:
a receiver, which in operation, receives a single uplink grant for a plurality of physical uplink shared channel (PUSCH) transmissions, the single uplink grant comprising an antenna port filed with an index value that is to be used for the plurality of PUSCH transmissions;
a processor, which in operation, determines time-domain resources based on the received uplink grant, the determined time-domain resources prescribing a number of PUSCH transmissions and a length of each of the number of PUSCH transmissions;
a transmitter, which in operation, transmits the number of PUSCH transmissions using the determined time-domain resources, each of the number of PUSCH transmissions comprising at least one front-loaded demodulation reference signal (DMRS),
wherein
the processor, in operation, determines a DMRS port number to be used for each of the at least one front-loaded DMRS of the number of PUSCH transmissions based on the received index value,
and, in case at least two of the number of PUSCH transmissions have different lengths, and in case different numbers of symbols are permissible for each of the at least one front-loaded DMRS,
the transmitter, in operation, transmits the same or a smaller number of PUSCH transmissions such that, for none of the comprised at least one front-loaded DMRS, a different determined DMRS port number is used.

7. The UE according to claim 6, wherein:
the processor, in operation, is configured to use a maximum number of 'two' symbols for each of the at least one front-loaded DMRS, such that:
a DMRS port is used with a number between 'zero' and 'seven' for a type 1 configuration, or
a DMRS port is used with a number between 'zero' and 'eleven' for a type 2 configuration.

8. The UE according to claim 6, wherein:
the processor, in operation, determines the DMRS port number to be used for each of the at least one front-loaded DMRS based on the different lengths of all of the number of PUSCH transmissions.

9. The UE according to claim 6, wherein:
the processor, in operation, additionally determines a number of symbols to be used for each of the at least one front-loaded DMRS of the number of PUSCH transmissions based on the received index value, and
in case at least two of the number of PUSCH transmissions have different lengths, and in case different numbers of symbols are determined to be used for the at least two of the number of PUSCH transmissions having different lengths,
the processor, in operation and when determining the DMRS port number, selects, for all of the number of PUSCH transmissions, a same DMRS port number which can be used for all of the at least one front-loaded DMRS, and
the transmitter, in operation, transmits the same number of PUSCH transmissions such that, for all of the comprised at least one front-loaded DMRS, the same DMRS port number is used with the different numbers of symbols.

10. The UE according to claim 9, wherein:
the processor, in operation and when determining the DMRS port number, selects for all of the number of PUSCH transmissions the DMRS port number such that:
a lower and a higher number of symbols is used for the at least one front-loaded DMRS, and
a same DMRS port number is used for the lower and a higher number of symbols, where the same DMRS port number to be used for all of the at least one front-loaded DMRS is same as the DMRS port number which is associated with the received index value;

and/or the processor, in operation and when selecting the DMRS port number, skips at least one PUSCH transmission from the number of PUSCH transmissions:
  which cannot comprise a higher number of symbols for each of the at least one front-loaded DMRS, and
  which cannot use the same DMRS port number as the DMRS port number which is associated with the received index value; and the transmitter, in operation, transmits the smaller number of PUSCH transmissions such that, for all of the at least one front-loaded DMRS, the higher number of symbols and the same DMRS port number is used.

11. A user equipment (UE) comprising:
a receiver, which in operation, receives a single uplink grant for a plurality of physical uplink shared channel (PUSCH) transmissions, the single uplink grant comprising an antenna port field with an index value that is to be used for the plurality of PUSCH transmissions;
a processor, which in operation, determines time-domain resources based on the received uplink grant, the determined time-domain resources prescribing a number of PUSCH transmissions and a length of each of the number of PUSCH transmissions;
a transmitter, which in operation, transmits the number of PUSCH transmissions using the determined time-domain resources, each of the number of PUSCH transmissions comprising at least one front-loaded demodulation reference signal (DMRS), wherein, in case different numbers of symbols are permissible for each of the at least one front-loaded DMRS, the transmitter, in operation, transmits the same number of PUSCH transmissions such that for all of the at least one front-loaded DMRS, the lower number of symbols is used, which is in accordance with received index value, and the transmitter, in operation, does not transmit any of the number of PUSCH transmissions in case the received index value is associated with a higher number of symbols to be used for the at least one front-loaded DMRS.

12. The UE according to claim 11, wherein:
the processor, in operation, is configured to use a maximum number of 'two' symbols which permits, for each of the at least one front-loaded DMRS, the use of:
  a single-symbol DMRS with a lower number of 'one' symbol, or
  a double-symbol DMRS with a higher number of 'two' symbols.

* * * * *